(12) United States Patent
Ivanov et al.

(10) Patent No.: US 9,518,885 B2
(45) Date of Patent: Dec. 13, 2016

(54) CARBON NANOTUBE TEMPERATURE AND PRESSURE SENSORS

(71) Applicant: UT-BATTELLE LLC, Oak Ridge, TN (US)

(72) Inventors: Ilia N. Ivanov, Knoxville, TN (US); David B. Geohegan, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 531 days.

(21) Appl. No.: 14/035,112

(22) Filed: Sep. 24, 2013

(65) Prior Publication Data

US 2014/0016671 A1 Jan. 16, 2014

Related U.S. Application Data

(62) Division of application No. 12/547,562, filed on Aug. 26, 2009, now Pat. No. 8,568,027.

(51) Int. Cl.
*G01K 7/01* (2006.01)
*G01L 19/00* (2006.01)
(Continued)

(52) U.S. Cl.
CPC .............. *G01L 19/00* (2013.01); *B82Y 30/00* (2013.01); *G01K 7/00* (2013.01); *G01K 7/021* (2013.01);
(Continued)

(58) Field of Classification Search
CPC ........ G01K 7/02; G01K 7/01; G01K 2211/00; G01K 7/00; G01K 7/028; G01K 7/14; G01K 7/16; G01K 7/21; B82Y 15/00; B82Y 30/00; Y10S 977/742; Y10S 977/955
(Continued)

(56) References Cited

U.S. PATENT DOCUMENTS 5,176,450 A 1/1993 Loftus
5,677,493 A 10/1997 Yamamoto et al.
(Continued)

FOREIGN PATENT DOCUMENTS

GB 2 403 995 A 1/2005
WO WO 2009/010303 A2 1/2009

OTHER PUBLICATIONS

R. Jin et al., "The effect of annealing on the electrical and thermal transport properties of macroscopic bundles of long multi-wall carbon nanotubes" Science Direct, www.elsevier.com/locate/physb , 2006 Elsevier B.V.
(Continued)

*Primary Examiner* — Gail Kaplan Verbitsky
(74) *Attorney, Agent, or Firm* — Scully, Scott, Murphy & Presser, P.C.

(57) ABSTRACT

The present invention, in one embodiment, provides a method of measuring pressure or temperature using a sensor including a sensor element composed of a plurality of carbon nanotubes. In one example, the resistance of the plurality of carbon nanotubes is measured in response to the application of temperature or pressure. The changes in resistance are then recorded and correlated to temperature or pressure. In one embodiment, the present invention provides for independent measurement of pressure or temperature using the sensors disclosed herein.

7 Claims, 12 Drawing Sheets

(51) Int. Cl.
| | |
|---|---|
| *B82Y 30/00* | (2011.01) |
| *G01K 7/02* | (2006.01) |
| *G01K 7/18* | (2006.01) |
| *G01L 1/20* | (2006.01) |
| *G01L 9/00* | (2006.01) |
| *G01K 7/00* | (2006.01) |
| *B82Y 15/00* | (2011.01) |

(52) U.S. Cl.
CPC .............. *G01K 7/028* (2013.01); *G01K 7/18* (2013.01); *G01L 1/20* (2013.01); *G01L 9/00* (2013.01); *G01L 9/0001* (2013.01); *G01L 9/0002* (2013.01); *G01L 9/0005* (2013.01); *B82Y 15/00* (2013.01); *G01K 2211/00* (2013.01); *Y10S 977/742* (2013.01); *Y10S 977/955* (2013.01); *Y10S 977/956* (2013.01)

(58) Field of Classification Search
USPC ........ 374/100, 163, 183, 179, 178; 977/701, 977/762, 773, 842, 902, 953
See application file for complete search history.

(56) References Cited

U.S. PATENT DOCUMENTS

| | | | |
|---|---|---|---|
| 6,535,824 B1 | 3/2003 | Mansky et al. | |
| 6,946,197 B2 | 9/2005 | Yadav et al. | |
| 6,956,698 B2 | 10/2005 | Li et al. | |
| 7,014,795 B2 | 3/2006 | Grigorov et al. | |
| 7,087,920 B1 | 8/2006 | Kamins | |
| 7,217,374 B2 | 5/2007 | Watanabe et al. | |
| 7,301,199 B2 | 11/2007 | Lieber et al. | |
| 7,312,096 B2 | 12/2007 | Kurtz | |
| 7,391,235 B2 | 6/2008 | Mouttet | |
| 7,434,470 B2 | 10/2008 | Engelhardt et al. | |
| 7,514,678 B2* | 4/2009 | Yao | B82Y 15/00 250/306 |
| 7,684,872 B2 | 3/2010 | Carney et al. | |
| 7,858,918 B2 | 12/2010 | Ludwig | |
| 8,044,472 B2 | 10/2011 | Kurtz et al. | |
| 8,052,324 B2* | 11/2011 | Gregory | G01K 7/028 136/236.1 |
| 8,063,730 B2 | 11/2011 | Chen et al. | |
| 8,110,883 B2 | 2/2012 | Ward et al. | |
| 8,300,420 B2 | 10/2012 | Tsai et al. | |
| 8,633,786 B2 | 1/2014 | Ermolov et al. | |
| 8,717,046 B2 | 5/2014 | Jensen et al. | |
| 8,926,933 B2* | 1/2015 | Zhang | B82Y 10/00 423/447.1 |
| 8,940,092 B1 | 1/2015 | Yeo et al. | |
| 9,028,142 B2 | 5/2015 | Raravikar et al. | |
| 9,222,837 B2* | 12/2015 | Mao | G01J 5/022 |
| 2002/0054924 A1* | 5/2002 | Leahy | A61K 36/45 424/732 |
| 2005/0036905 A1 | 2/2005 | Gokturk | |
| 2005/0159745 A1 | 7/2005 | Truckai et al. | |
| 2005/0192727 A1 | 9/2005 | Shostak et al. | |
| 2006/0253942 A1* | 11/2006 | Barrera | B82Y 15/00 73/661 |
| 2007/0085002 A1* | 4/2007 | Yao | B82Y 15/00 250/307 |
| 2008/0017356 A1* | 1/2008 | Gruss | H01L 23/427 165/104.33 |
| 2008/0212261 A1 | 9/2008 | Ajayan et al. | |
| 2008/0223514 A1 | 9/2008 | Hantschel et al. | |
| 2008/0231361 A1 | 9/2008 | Ludwig | |
| 2008/0251723 A1 | 10/2008 | Ward et al. | |
| 2009/0020148 A1* | 1/2009 | Boukai | H01L 35/26 136/201 |
| 2009/0121732 A1 | 5/2009 | Crafts et al. | |
| 2010/0118916 A1 | 5/2010 | Thomsen, III | |
| 2010/0127172 A1* | 5/2010 | Nikoobakht | B81B 3/0081 250/332 |
| 2010/0155698 A1 | 6/2010 | Lieber et al. | |
| 2011/0003279 A1 | 1/2011 | Patel | |
| 2011/0013669 A1* | 1/2011 | Raj | G01K 1/08 374/179 |
| 2011/0018566 A1 | 1/2011 | Crafts et al. | |
| 2011/0102183 A1 | 5/2011 | Tenchio | |
| 2011/0171655 A1* | 7/2011 | Esfandyarpour | C12Q 1/6869 435/6.12 |
| 2011/0210415 A1* | 9/2011 | Altavilla | G01K 7/186 257/467 |
| 2012/0007607 A1 | 1/2012 | Lowe et al. | |
| 2012/0022620 A1* | 1/2012 | Khodak | A61F 7/007 607/96 |
| 2012/0054924 A1* | 3/2012 | Zhang | B82Y 15/00 850/6 |
| 2012/0195344 A1 | 8/2012 | Bernier et al. | |
| 2013/0142566 A1* | 6/2013 | Yu | C25D 1/04 403/271 |
| 2013/0248712 A1* | 9/2013 | Abdolvand | G01J 5/022 250/338.1 |
| 2013/0260113 A1 | 10/2013 | Hart | |
| 2014/0269830 A1 | 9/2014 | Wardle | |
| 2014/0326883 A1* | 11/2014 | Abdolvand | G01J 5/022 250/338.1 |
| 2014/0338712 A1* | 11/2014 | Porod | G01J 5/12 136/201 |
| 2014/0360661 A1 | 12/2014 | Kabir et al. | |
| 2015/0168221 A1* | 6/2015 | Mao | G01J 5/022 257/467 |
| 2015/0207052 A1* | 7/2015 | Carr | G01J 5/14 73/1.57 |
| 2016/0123947 A1 | 5/2016 | Briman et al. | |

OTHER PUBLICATIONS

J.E. Fischer et al., "Metallic resistivity in crystalline ropes of a single-wall carbon nanotubes", 1997 The American Physical Society, vol. 55, No. 8.

Alexander M. Zaitsev, et al., "Temperature and Chemical Sensors Based on FIB-Written Carbon Nanowires", IEEE Sensors Journal, vol. 8, No. 6, Jun. 2008.

A.B. Kaiser, "Electronic transport properties of conducting polymers and carbon nanotubes" Institute of Physics Publishing, Rep. Prog. Phys. 64 (2001) 1-49.

C. Gau, et al., Nano Temperature Sensor Using Selective Lateral Growth of Carbon Nanotube Between Electrodes, Proceedings of 2005 5th , IEEE Conferences on Nanotechnology, Nagoya, Japan, Jul. 2005.

J. Vavro et al., "Metal-insulator transition in doped single-wall carbon nanotubes", 2005, The American Physical Society, B. 71.

John Liu, "Design, Fabrication, and Testing of Piezoresistive Pressure Sensors Using Carbon Nanotubes", Stanford Nanofabrication Facility (2002).

Takao Someya et al., "Alcohol Vapor Sensors Based on Single-Walled Carbon Nanotube Field Effect Transistors", Nano Letters, vol. 3, 877-881 (2003).

Tsu-Wei Chou et al., Nanomechanical Sensors Based on Carbon Nanotube Arrays, NSF Nanoscale Science and Engineering Grantess Conference, Dec. 16-18, 2003.

Paolo Lugli, Plastronics molecular, organic and biological electronics: an overview: Micro-Nano Technologies for Space; May 2003.

Jian Wu, "Computational Design of Carbon Nanotube Electromechanical Pressure Sensors", The American Physical Society (2004).

Alexander Star et al., "Nanoelectronic Carbon Dioxide Sensors", Advanced Materials 16, No. 22, pp. 2049-2052 (2004).

Randal J. Grow et al., "Piezoresistance of Carbon Nanotubes on Deformable Thin-Film Membrances", Applied Phsics Letters (2005).

Progress Report for ITAS MSFT "Nanoscale Device and Material Integration: Carbon Nanotube Based Materials for NDE", Apr. 2005.

Prof. Feng Liu, Computational R&D for Industrial Applications, Department of Materials Science & Engineering, Center for Computational Design & Testing of Novel Nanomaterials, University of Utah, Fall 2005.

(56) References Cited

OTHER PUBLICATIONS

Danvers E. Johnston et al., "Electronic Devices Based on Purified Carbon Nanotubes Grown by High Pressure Decomposition of Carbon Monoxide", Department of Physics and Astronomy, University of Pennsylvannia, 2005.
C. Stampfer et al., "Frabrication of Single-Walled Carbon Nanotubes-Based Pressure Sensors" American Chemical Society, vol. 6, No. 2, pp. 233-237,(2006).
Professor Dr. Christofer Hierold "FEM Simulations on Single-Walled Carbon Nanotube Based Pressure Sensor Systems", Mikro-Und Nanostysteme (2006).
Chunyu Li "Atomistic Modeling of Carbon Nanotube-Based Mechanical Sensors", Journal of Intelligent Material Systems and Structures, vol. 17, No. 3, 247-254 (2006).
In-Mook Choi et al., "Development of Low Pressure Sensor Based on Carbon Nanotube be Field Emission" Institute of Physics Publishing, Metrologia (2006).
Sinha et al., "Carbon Nanotube-Based Sensors", Ingentaconnect (2006).
Nasa, "Nanoscale Mass Transport and Carbon Nanotube Based Membranes" (2006), http://www.gov/centers/ames/research/technology-onepagers/nanoscale_prt.htm.
Brendan Crawford, et al. "Flexible Carbon Nanotube Based Temperature Sensor for Ultra-Small-Site Applications", Dept. of Mechanical and Industrial Engineering College of Engineering, Northeastern University, Boston, MA. Dec. 2007.
U.S. Office Action dated Dec. 28, 2015 in U.S. Appl. No. 14/035,097.
U.S. Final Office Action dated Apr. 20, 2016 in U.S. Appl. No. 14/035,097.
U.S. Final Office Action dated Feb. 3, 2016 in U.S. Appl. No. 14/035,080.
U.S. non-Final Office Action dated Jul. 22, 2016 in U.S. Appl. No. 14/035,105.
U.S. non-Final Office Action dated Mar. 2, 2016 in U.S. Appl. No. 14/035,105.
U.S. Office Action dated Sep. 4, 2015 in U.S. Appl. No. 14/035,080.

* cited by examiner

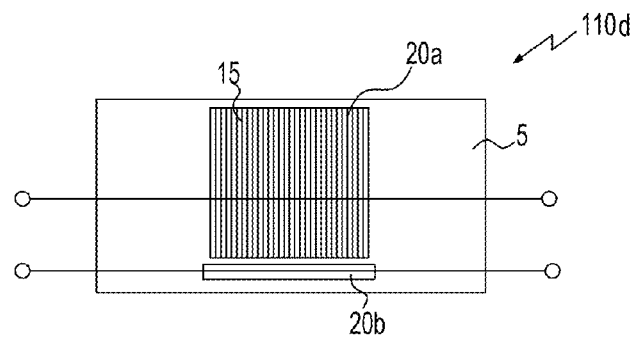
FIG. 8
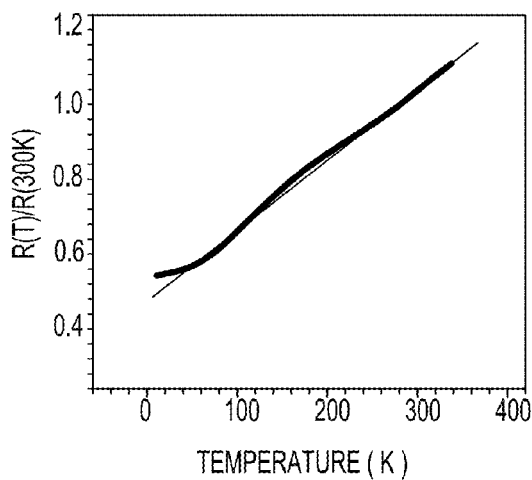
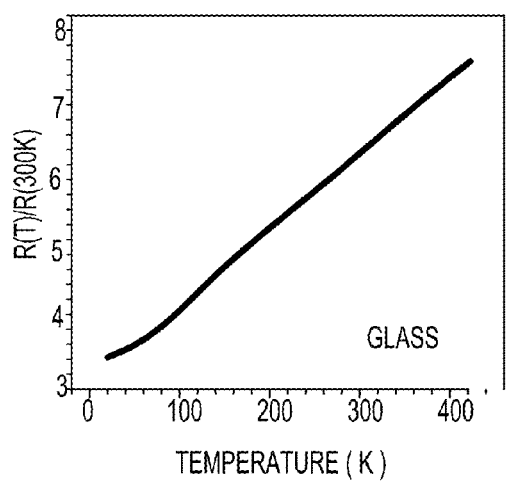
FIG. 9A     FIG. 9B
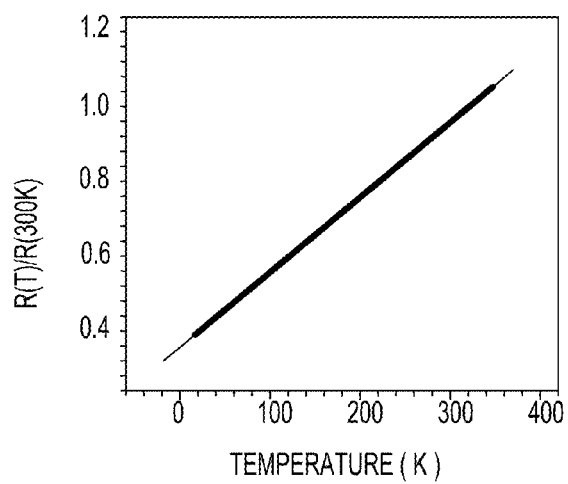
FIG. 9C

CARBON NANOTUBE TEMPERATURE AND PRESSURE SENSORS

CROSS REFERENCE TO RELATED APPLICATION

This application is a divisional of U.S. patent application Ser. No. 12/547,562, filed Aug. 26, 2009 the entire content and disclosure of which is incorporated herein by reference.

This invention was made with government support under contract no. DE-AC05-00OR22725 awarded by the U.S. Department of Energy. The government has certain rights in the invention.

FIELD OF THE INVENTION

The present invention generally relates to sensors composed of nanoscale structures, such as carbon nanotubes.

BACKGROUND OF THE INVENTION

Materials technology has had a profound impact on the evolution of human civilization. In the $21^{st}$ century, people are developing smart materials and smart sensors. Typically, materials employed for temperature and pressure sensing applications, such as polymers, exhibit both responses simultaneously, making it difficult to determine whether a change in temperature, pressure or both has occurred. More specifically, because temperature and pressure sensors composed of polymeric sensing elements respond simultaneously to both pressure and temperature it is difficult to determine what external environment has been applied to the sensor.

SUMMARY OF THE INVENTION

In one embodiment a sensor is provided that includes a first sensor element for measuring temperature and a second sensor element for measuring pressure. Broadly, the sensor includes a substrate, a first sensor element present on a first portion of the substrate composed of a first plurality nanostructures having a fixed number of electrical junctions, wherein changes in resistance or capacitance of the electrically interconnected carbon nanotubes is correlated to temperature measurements that are independent of pressure, and a second sensor element composed of a second plurality of nanostructures in which the number of junctions between the second plurality of nanostructures varies with changes in pressure that is applied to the second sensor element wherein resistance or capacitance changes in response to changes in the number of junctions between the second plurality of carbon nanotubes is correlated to a pressure measurement.

In one embodiment, a method of measuring temperature is provided that is independent of pressure. Broadly, the method may include providing a sensor element composed of a plurality of electrically interconnected nanostructures having a fixed number of junctions between each of the electrically interconnected nanostructures, applying a current through the electrically interconnected nanostructures, measuring electrical properties of the electrically interconnected nanostructures in response to an application of temperature to the sensor element, and correlating the electrical properties of the electrically interconnected nanostructures to temperature.

In one embodiment, a temperature sensor is provided that may be employed in the above described method of measuring temperature. Broadly, the temperature sensor may include a sensor element including a plurality of electrically interconnected carbon nanotubes having a fixed number of junctions between each of the electrically interconnected nanotubes, at least one electrical contact to the sensor element in electrical communication with the plurality of electrically interconnected carbon nanotubes, and a power source in connection with the at least one electrical contact providing a substantially constant current to the plurality of electrically interconnected carbon nanotubes, wherein resistance or capacitance of the electrically interconnected carbon nanotubes is correlated to temperature.

In another aspect, a temperature sensor is provided in which at least two carbon nanotubes are utilized in a thermocouple arrangement. Broadly, the temperature sensor includes a thermocouple body including a first carbon nanotube and a second carbon nanotube, the first carbon nanotube and the second carbon nanotubes having a junction at a first end of the thermocouple body, wherein the first carbon nanotube and the second carbon nanotube have dissimilar electrical properties, and a voltmeter in electrical communication with the first carbon nanotube and the second carbon nanotube, wherein the application of temperature to the first end of the thermocouple body produces a current in a circuit composed of the first carbon nanotube and the second carbon nanotube that is proportional to a temperature that is applied to the junction at the first end of the thermocouple body.

In another aspect, a method of measuring pressure is provided. Broadly, the method of measuring pressure includes providing a sensor element including a plurality of nanostructures; applying a current or voltage through the plurality of nanostructures; measuring electrical properties of the plurality of nanostructures in response to an application of pressure that increases or decreases a number of junctions in the plurality of nanostructures in the sensor element; and correlating the electrical properties of the plurality of nanostructures to pressure.

In one embodiment, a pressure sensor is provided that may be employed in the above-described method. Broadly, the pressure sensor includes a sensor element comprised of a plurality of vertically aligned carbon nanotubes fixed to a substrate, at least one electrical contact to the vertically aligned carbon nanotubes carbon nanotubes, and a power source in connection with the at least one electrical contact providing a substantially constant current to the plurality of vertically aligned carbon nanotubes carbon nanotubes, wherein resistance or capacitance of the electrically interconnected carbon nanotubes is correlated to pressure.

In another embodiment, a pressure sensor is provided that includes a plurality of flexible membranes each including electrically interconnected nanostructures, and a power source to the electrically interconnected nanostructures, wherein an external force applied to the pressure sensor deforms at least one of the plurality of flexible membranes into contact with an adjacent flexible membrane of the plurality of flexible membranes, in which changes in the electrical properties of the plurality of flexible membranes that results from the external force is correlated to a pressure value for the external force.

In another aspect, the present invention provides a sensor that includes a sensor element including a plurality of electrically interconnected nanostructures, a power supply to the plurality of electrically interconnected nanostructures, wherein the connectivity of the power supply to the electrically interconnected nanostructures provides a circuit, and a resonator in electrical communication with the circuit, in which electrical properties to the electrically interconnected nanostructures are varied by application of temperature or pressure to the pad, wherein changes in the electrical properties result in an impedance change in the circuit that produces a frequency response in the resonator, wherein the frequency response of the resonator is correlated to temperature or pressure.

BRIEF DESCRIPTION OF THE DRAWINGS

The following detailed description, given by way of example and is not intended to limit the invention solely thereto, will best be appreciated in conjunction with the accompanying drawings, wherein like reference numerals denote like elements and parts, in which:

FIG. 8 depicts a side cross-sectional view of a sensor including separate sensor elements for independent measurements of pressure and temperature, in accordance with the present invention.

FIGS. 9A, 9B, and 9C are plots depicting the linearity of the temperature dependent resistivity characteristics of at least one temperature sensor incorporating a sensor element having carbon nanotubes present therein, as used in accordance with the present invention.

DETAILED DESCRIPTION OF THE INVENTION

Figure 1:
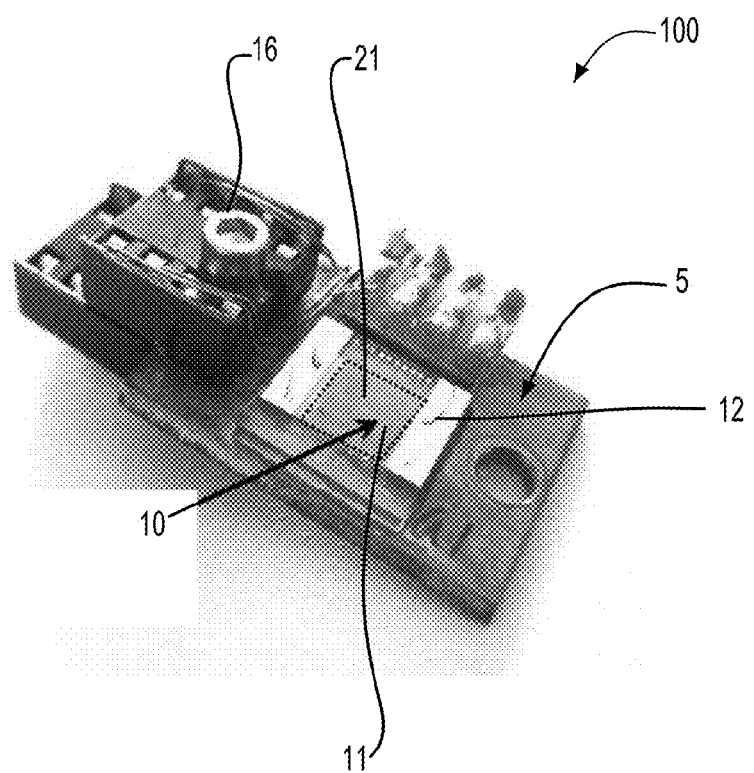
FIG. 1 is a photograph depicting a perspective view of one embodiment of a temperature sensor, in accordance with the present invention.

The present invention relates to the application of carbon nanotubes to temperature and pressure sensors, wherein the nature of the interconnection of the carbon nanotubes dictates the sensing characteristics of the sensor. The electrical properties, e.g., resistance, of carbon nanotubes have been determined to have a linear response to changes in temperature. In one example, by fixing the number of junctions between adjacent carbon nanotubes, the electrical pathway by which current travels through a plurality of electrically interconnected carbon nanotubes is held constant. By fixing the number electrical pathways through the plurality of electrically interconnected carbon nanotubes, the linearity of the electrical property response of the carbon nanotubes to variations in temperature may be realized so that temperature is measured independent of pressure.

In other embodiments of the present invention, the number of junctions may be varied in response to pressure. More specifically, when the number of junctions between adjacent carbon nanotubes that provide a plurality of electrically interconnected carbon nanotubes is not fixed, the application of pressure can increase the number of junctions to provide for an increase in the number of electrical pathways by which current travels through the electrically interconnected carbon nanotubes. Because, the decrease in resistance that results from the increased number of electrical pathways is at least one order of magnitude greater than the linear response of the electrical properties of the carbon nanotubes to temperature, the pressure may be measured independent of temperature.

Using the above principles, and by controlling the junction behavior between electrically interconnected carbon nanotubes, sensor elements may be provided in which temperature is measured independent of pressure and pressure is measured independent of temperature. Further, sensors can be provided that include a combination of temperature and pressure sensor elements, in which temperature sensor elements measure temperature independent of pressure, and pressure sensor elements measure pressure independent of temperature.

Detailed embodiments of the present invention are disclosed herein; however, it is to be understood that the disclosed embodiments are merely illustrative of the invention that may be embodied in various and alternative forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

When describing the inventive structures and methods, the following terms have the following meanings, unless otherwise indicated.

As used herein a "sensor element" is the portion of a sensor that is exposed to a pressure or temperature to be measured.

As used herein a "nanostructure" is an object having at least one dimension between molecular and microscopic (micrometer-sized) dimension.

"Nanotube" as used herein is meant to denote one form of nanostructure having an aspect ratio of length to width greater than 10. The term "nanotube" includes single wall and multi-wall nanotubes unless specifically specified as distinct. In one embodiment, a carbon nanotube is at least one graphene layer wrapped into a cylinder. In one embodiment, a single wall carbon nanotube is a graphene rolled up into a seamless cylinder with diameter of the order of a nanometer. A multi-wall carbon nanotube is a plurality of graphene sheets rolled up into a seamless cylinder with diameter of the order of a nanometer.

"Electrical contact" means the electrically conductive connection from the plurality of electrically interconnected nanotubes to the circuit from which electrical properties are measured.

"Electrically interconnected" as used in conjunction with nanostructures means an electrically conductive pathway that is composed of at least two nanostructures that are engaged in electrical communication.

"Junction" with respect to nanostructures, e.g., nanotubes, means a point at which two nanostructures can transfer electrical charge from a first nanostructure to a second nanostructure in a plurality of electrically interconnected nanostructures.

"Electrically conductive", "electrical communication", and/or "electrically communicating" as used through the present disclosure means a material having a room temperature conductivity of greater than $10^{-8}$ $(\Omega\text{-m})^{-1}$.

"Linear" as used to describe the response in the electrical properties of the sensor element (having electrically interconnected carbon nanotubes therein) to changes in temperature means that a plot of the electrical properties of the sensor element, e.g., resistance or current, verses the temperature applied to the sensor element has a linear slope.

The term "independent" as used to describe the relationship between temperature and pressure in a sensor element that is measuring temperature means that there is substantially no change in the linear response of the electrical properties of the sensing element to changes in temperature by the application of pressure, so long as the application of pressure does not change the number of points of interconnection between the electrically interconnected carbon nanotubes in the sensor element.

A "matrix" is a medium between nanostructures that may be composed of a gas, liquid or solid.

For purposes of the description hereinafter, the terms "upper", "lower", "right", "left", "vertical", "horizontal", "top", "bottom", "beneath", "underlying", "below", "overlying" and derivatives thereof shall relate to the invention, as it is oriented in the drawing figures.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention embodies the use of nanostructures, e.g., carbon nanotubes, such as nanotube mats, nanotube arrays, and composites thereof, as temperature and pressure sensors. In some examples, configurations of nanostructures, e.g., carbon nanotubes, such as nanotube mats, exhibit temperature sensing abilities, e.g., resistance as a function of temperature (resistance vs. temperature), with little to no pressure dependence, i.e., insensitive to pressure, so that temperature may be measured and sensed independent of pressure. In other embodiments, configurations of nanostructures are described that exhibit pressure sensing abilities, e.g., pressure as a function of temperature (pressure vs. temperature), with little to no temperature dependence, i.e., insensitive to temperature, so that pressure may be measured and sensed independent of temperature.

Although the following description is directed to temperature and pressure sensors having sensor elements composed of carbon nanotubes, the present invention is not limited thereto, as other nanostructures have been contemplated and are within the scope of the present invention. For example, the nanostructures that may be utilized in the sensor structures of the present invention include, but are not limited to: nanoribbons, such as carbon or ZnO nanoribbons; nanorods, such as ZnO nanorods doped with F, N, or $In_2O_3$ nanorods doped with Sn; or nanocylinders, such as single walled nanotubes, double wall nanotubes, few wall nanotubes, or multi-wall nanotubes. In one embodiment, the material of the nanostructures could be carbon and/or a metal oxide that is doped to increase conductivity, for example doped with small molecules or metal ions. Additionally, nanowires, nanotubes and nanoparticles have been considered as suitable materials to provide the temperature and pressure sensors that are disclosed herein.

FIG. 1 is a photograph depicting one embodiment of a temperature sensor 100 having at least one sensor element 10 that includes nanostructures present therein. The temperature sensor 100 may include a sensor element 10 that in one embodiment is provided by a plurality of electrically interconnected carbon nanotubes having a fixed number of junctions between each of the electrically interconnected carbon nanotubes. In one embodiment, the plurality of electrically connected carbon nanotubes are fixed to a rigid substrate 5. The temperature sensor 100 may further include at least one electrical contact 12 to the sensor element 10 in electrical communication with the plurality of electrically interconnected carbon nanotubes. A power source 16 may also be present that is in connection with the at least one electrical contact 12 to provide a substantially constant current to the plurality of electrically interconnected carbon nanotubes. In one embodiment, in which the sensor element 10 is applied to an exterior temperature or pressure, the resistance or capacitance of the electrically interconnected carbon nanotubes is correlated to temperature, hence providing a measurement for the exterior temperature.

Figure 2:
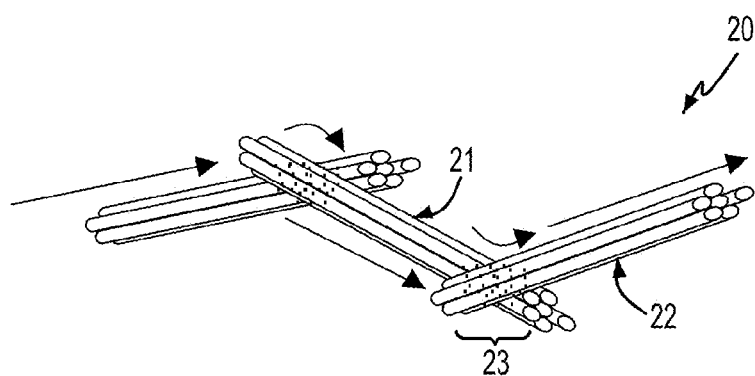
FIG. 2 pictorially depicts one embodiment of a network of electrically interconnected carbon nanotubes as used in accordance with the present invention.

In one embodiment, the electrically interconnected carbon nanotubes that are incorporated within the sensor element 10 are comprised of a mat of single or multi-wall carbon nanotubes. In one example, the electrically interconnected carbon nanotubes are provided by single wall carbon nanotube mats, as depicted in FIG. 2. In some instances, due to the mechanisms of charge conduction in carbon nanotubes 21, and the geometry of their networks, the resistance of nanotube networks display a linear temperature dependent phenomena. Typically, a single wall carbon nanotube mat is provided in the form of a thin electrically conductive film on a substrate 5, that in some instances may be transparent, which provides the sensor element 10. As depicted in FIG. 2, single wall carbon nanotube networks 20 are principally bundles 22 and junctions 23. Each bundle 22 may include a plurality of substantially parallel carbon nanotubes 21. Current flows along the bundle 22 of pseudo metallic segments, i.e., carbon nanotubes 21, and hops to another bundle 22 at the junctions 23 between the bundles 22. Current hoping is a fluctuation induced tunneling between metallic regions, i.e., bundle 22 of carbon nanotubes 21, across thin barriers, i.e., matrix that is present between the bundles 22 of carbon nanotubes 21 at the junctions 23.

It has been determined that the electrical resistivity of circuits formed using the above described carbon nanotube networks varies with changes in temperature. More specifically, in one embodiment, when a change in temperature is applied to a circuit that has been formed using a network of electrically interconnected carbon nanotubes a change in the resistivity of that circuit may be measure. For example, an oriented film of multiwall nanotubes may have a resistivity that is measured along the longest axis of the carbon nanotube of approximately 20 mΩ*cm or less at a temperature of 300K, which has been measured to increase gradually in a linear manner with increasing temperature. By linear it is meant that when the resistivity is plotted as a function of temperature the slope of the line will be substantially equal to y=m(x)+b.

In one embodiment, the electrically interconnected carbon nanotubes have a temperature dependent resistivity that is defined by:

$$\rho(T)=\alpha T+\rho_t \exp(T_t/(T+T_s))$$

wherein $\rho$ is the resistance in ohms/cm$^2$, T is the temperature, $\alpha$ and $\rho_t$ are temperature independent constants which incorporate geometric factors of the sample, $T_t$ is the temperature corresponding to thermal voltage fluctuations which increase energy of electronic states above the activation energy, and $T_t/T_s$ is the ratio defining the tunneling in the absence of thermal fluctuations. The expression $\alpha T$ represents the metallic conductivity, i.e., the conductivity of the carbon nanotubes 21, and the expression $\rho_t \exp(T_t/(T+T_s))$ represents the barrier hoping conductivity that is measured at the nanotube bundle junctions 23 or nanotube defects.

Figure 3:
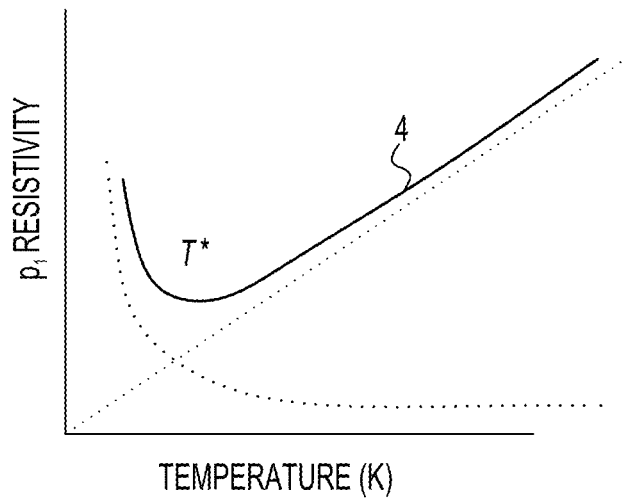
FIG. 3 is a plot depicting the temperature dependent resistivity characteristics of at least one embodiment of a network of carbon nanotubes as used in accordance with the present invention.

Using the above temperature dependent resistivity characteristics of the electrically interconnected carbon nanotubes, a temperature sensor 100 may be provided in which a current is passed through a circuit containing the electrically interconnected carbon nanotubes, wherein changes in the resistivity that are measured from the electrically interconnected carbon nanotubes can be correlated to temperature. FIG. 3 depicts a plot indicated by reference number 4 of one embodiment of the linearity that may be provided by a temperature sensor including a sensor element 10 composed of a plurality of electrically interconnected carbon nanotubes. The linearity of the relationship between resistance and temperature is maintained so long as the temperature does not affect the interconnectivity of the carbon nanotubes. For example, when the interconnectivity of the carbon nanotubes is dictated by a supporting material, such as a rigid substrate 5, the linearity of the relationship between resistance and temperature is maintained so long as the temperature does not degrade the structural integrity of the supporting material. In one embodiment, the linearity of the relationship between resistivity and temperature of the sensor element 10 of the temperature sensor 100 is maintained at temperatures as great as about 550° K. In one embodiment, the linearity of the relationship between resistivity and temperature of the sensor element 10 of the temperature sensor 100 is maintained at temperatures ranging from about 0° K to about 500° K, typically ranging from about 150° K to about 300° K.

One feature of carbon nanotube that contributes to the linear electrical property response to the application of temperature is that carbon nanotubes have a zero thermal expansion coefficient. Therefore, because the application of temperature does not result in a dimensional change of the carbon nanotubes, the junctions between the electrically interconnected carbon nanotubes are not affected by temperature variations.

In one aspect of the invention, due to the fixed number of junctions 23 between the plurality of electrically interconnected carbon nanotubes 21 in the sensor element 10, the temperature response that may be measured through electrical resistivity is independent of pressure. More specifically, because the electrically interconnected carbon nanotubes 21 have a fixed number of junctions 23, the electrically conductive pathways though the electrically interconnected carbon nanotubes 21 are not varied by changes in pressure. In embodiments of the invention in which the number of junctions 23 are not fixed, pressure changes can vary the number of junctions 23, which in turn changes the number of electrical pathways through the plurality of electrically interconnected carbon nanotubes 21, hence changing the resistivity of the plurality of electrically interconnected carbon nanotubes 21. Therefore, fixing the number of junctions 23 in the plurality of electrically interconnected carbon nanotubes 21 eliminates or at least minimizes the changes in electrical properties that typically result from pressure changes applied to the sensor element 10. Because the number of junctions 23 of the electrically interconnected carbon nanotubes 21 are fixed, the linear electrical property response of the plurality of electrically interconnected carbon nanotubes 21 to temperature can be measured without variation that results from the application of pressure, hence providing a sensor element 10 for measuring temperature that is insensitive to pressure. The thickness of the sensor element 10 of electrically interconnected carbon nanotubes is another factor that may contribute to the pressure independence of the temperature reading by providing a substantially fixed array of electrically interconnected carbon nanotubes. For example, a single layer of electrically interconnected carbon nanotubes on a substrate would be less susceptible to variations in electrical properties that result from pressure applications than multiple layers of electrically interconnected carbon nanotubes to the application of pressure, because a sensor element having a single layer of carbon nanotubes would eliminate the possibility of junctions formed by compressing the carbon nanotubes of the multiple layers into electrical contact in a manner that would increase the number of junctions between the carbon nanotubes. In one embodiment, the fixed nature of the bundles of carbon nanotubes may be aided by the introduction of a rigid matrix, such as a polymer having a shear modulus of 0.01 GPa at 300° K or greater, wherein in some examples the matrix material may have a shear modulus of 0.1 GPa at 300° K or greater.

The application of pressure to the sensor element 10 of a pressure independent temperature sensor 100 may result in a change in the value of the resistance for the electrically interconnected carbon nanotubes 21 that is no greater than variations in the resistance that occurs from experimental error, i.e., measurement error. Measurement error for the resistance may result from contact resistance within the measurement device or contact resistance from the measurement device to the sensor element 10. Variations from measurement error for the resistance of the sensor element 10 may be about 15.0% or less of the resistance being measured, more typically being less than 10.0%, and in some instances as low as 5.0% or less. Therefore, the application of pressure to the sensor element 10 of a pressure independent temperature sensor 100 may result in a change in the value of the resistance for the electrically interconnected carbon nanotubes 21 that is not greater than 10%. In an even further embodiment, the electrical properties of the sensing element that are correlated to a temperature value are not varied by a value greater than 5% by the application of a pressure. In yet another embodiment, the electrical properties of the sensing element that are correlated to a temperature value are not varied by a value greater than 0.5% by the application of a pressure.

In one embodiment, the thickness of the sensor element 10 may be greater than 20 nm. In one example, the thickness of the sensor element 10 of the electrically interconnected nanotubes 21 is no greater than 100 nm. In another embodiment, the thickness of the sensing element 10 that includes the pad 11 of the electrically connected nanotubes 21 ranges from about 20 nm to about 50 nm. In an even further embodiment, the thickness of the sensing element 10 of the electrically connected nanotubes 21 is less than 20 nm.

The carbon nanotubes 21 that provide the sensing element 10 typically have a high purity, i.e., have a low incidence of impurities. In one embodiment, the carbon nanotubes may have a high purity on the order of about 95% to about 99% carbon. In an even further embodiment, the carbon nanotubes have a high purity on the order of about 99% or greater.

The electrically interconnected carbon nanotubes having a fixed number of junctions may be provided by mat of carbon nanotubes, such as a mat of single wall carbon nanotubes. In one embodiment, a mat of single wall carbon nanotubes may be provided by laser vaporization. In one embodiment, the single wall carbon nanotubes are formed using laser vaporization in combination with a catalyst, such as a metal catalyst. In one embodiment, the catalyst is supported on a substrate, such as a graphite substrate, or the catalyst may be floating metal catalyst particles. In one embodiment, the metal catalyst may be composed of Fe, Ni, Co, Rh, Y or alloys and combinations thereof.

In one embodiment, laser vaporization includes a laser beam that impinges on a carbon (also referred to as graphite) target, such as a volume of a carbon containing feedstock gas, e.g., methane or carbon monoxide. In one embodiment, the laser used to vaporize the carbon target is a pulsed laser or is a continuous laser, wherein the carbon target is present in an oven at a temperature on the order of about 1200° C. In one embodiment, a pulsed laser has a light intensity on the order of about 100 kW/cm$^2$, wherein a continuous laser has a light intensity on the order of about 12 kW/cm$^2$. In one embodiment, the oven is filled with helium or argon gas in order to keep the pressure at 500 Torr.

In one embodiment, vapor plumes form, expand and cool. As the vaporized species cools, carbon molecules and atoms quickly condense to form larger clusters, which may include fullerenes. In one embodiment, the catalysts also begin to condense and attach to carbon clusters and prevent their closing into cage structures. Catalysts may open cage structures when they attach to them. In one embodiment, from these initial clusters, tubular molecules grow into single-wall carbon nanotubes until the catalyst particles become too large, or until conditions have cooled sufficiently that carbon no longer can diffuse through or over the surface of the catalyst particles. In one embodiment, the single-wall carbon nanotubes formed in this case are bundled together by van der waals forces to provide the network similar to that depicted in FIG. 2.

The diameter of a single wall nanotube, as used in accordance with the present invention, typically ranges from about 1 nanometer to about 50 nanometers. In another embodiment, the diameter of a single wall nanotube ranges from about 1.2 nanometers to about 1.6 nanometers. In one embodiment the length of a single wall nanotube, as used in accordance with the present invention ranges from about 50 nanometers to about 10 microns. In another embodiment, the length of a single wall nanotube ranges from about 10 microns to about 20 millimeters. In one embodiment, the nanotubes used in accordance with the present invention have an aspect ratio of length to diameter on the order of approximately 200:1.

The carbon nanotubes produced by laser vaporization are typically formed in bundles. A bundle is a plurality of interconnected carbon nanotubes. In one example, a bundle of nanotubes contains on the order of 10,000 nanotubes or less. In another example, a bundle of nanotubes typically includes on the order of approximately 50 to approximately 5000 nanotubes. In one embodiment, a bundle of nanotubes has a diameter on the order of about 0.9 nm or greater.

The nanotubes comprise a majority of carbon typically being of high purity. In other examples, the nanotubes include a carbon content ranging from being greater than 50%, wherein a purification process is utilized to provide carbon nanotubes having of high purity, such as greater than 90% carbon. In one embodiment, the carbon nanotubes may be purified by a process that includes an acid treatment followed by an oxidation. In one embodiment, the acid treatment may include treatment and oxidation steps are provided by a dilute $HNO_3$ reflux/air oxidation procedure.

In a following process step, the carbon nanotubes may be doped to adjust the conductivity of the carbon nanotubes. In one embodiment, n-type and p-type doping of carbon nanotubes is desirable to tune the conductivity of the carbon nanotubes for sensor applications. P-type denotes that the nanotube includes an excess of holes, i.e., positive charge carriers, wherein the nanotube may be doped with dopants to provide the excess of holes. N-type denotes that the nanotube includes an excess of electrons, i.e., negative charge carriers, wherein the nanotube may be doped with dopants to provide an excess of electrons.

In one embodiment, the carbon nanotubes become p-type following growth once exposed to the ambient air, wherein oxygen molecules are absorbed onto the carbon nanotube surface and through surface interactions alter the nanotube's electrical state rendering the nanotubes p-type conductivity. In another embodiment, exposure of the nanotube to potassium atoms may result in absorption of the potassium to the carbon nanotube, which dopes that region of the nanotube n-type. In a further embodiment, exposure of the carbon nanotube, to fluorinated carboxylic acids and sulfonic acids produces a p-type conductivity carbon nanotube.

The nanotubes may be doped during production; purification processing, and/or post-processing. In one embodiment, the nanotubes may be doped during synthesis or by post processing through the use of gases, liquids, or solids, such as polymers, such as the polymers used in the polymer matrix. For example, post-growth doping nanotubes may be accomplished via deposition of dopant from vapor, liquid of solid phase in controlled atmosphere, vacuum or air. In one embodiment, deposition of dopants from vapor includes vapor gas absorption onto the carbon nanotubes. In one embodiment, deposition of dopants from liquid includes liquid dipping followed by a post treatment that may include heating and/or cooling. Examples of dopants may include, but are not limited to: nitric acid, thionyl chloride ($SOCl_2$), triethylamine ($Et_3N$), pyridine ($C_6H_5N$), orthodichlorobenzene or combinations thereof.

Although the above description is related to bundles of single or multi-wall carbon nanotubes, embodiments have been contemplated in which vertically aligned carbon nanotubes have been utilized in temperature sensors, so long as the vertically aligned carbon nanotubes are fixed in a rigid matrix so that the number of junctions that provide the electrical pathway though the sensor element 10 may be fixed.

Referring to FIG. 1, the sensor element 10 that is provided by the plurality of electrically interconnected carbon nanotubes is typically fixed to a rigid substrate 5. Rigid as used to describe the substrate 5 to which the electrically interconnected carbon nanotubes is fixed means that the substrate 5 has a shear modulus of 0.01 GPa at 300° K or greater. In one embodiment, the substrate 5 has a shear modulus ranging from 0.01 GPa to 478 GPa. In an even further embodiment, the substrate 5 has a shear modulus ranging from 1 GPa to 100 GPa. The rigid substrate 5 is typically composed of a glass, plastic, metal, or semiconductor material.

In one embodiment, the plurality of electrically interconnected carbon nanotubes may be positioned on the substrate 5 using a variety of deposition techniques that may include, but are not limited to: filtration of nanotubes from solutions onto filter paper and transferal to the substrate 5, spray deposition of solvated or suspended nanotubes, inkjetting, electrophoretic deposition onto substrates, electrospinning or a combination thereof.

In some embodiments, the plurality of electrically interconnected carbon nanotubes may be disposed within a matrix that may include, but is not limited to: insulating or conductive polymers, ceramics, metal powders and combinations thereof. The matrix may be employed to enhance or restrict conduction between the nanotubes themselves in the interconnected network. In one embodiment, the matrix may be composed of a polymer selected from the group including: but not limited to: poly(phenylene vinylene), polythiophenes, polypyridines, poly(pyridyl vinylenes), polyphenylenes and copolymers of these materials. In one embodiment, the polymer of the matrix may be a conjugated polymer. Conjugated polymers have a framework of alternating single and double carbon-carbon and/or carbon-nitrogen bonds or carbon-sulfur bonds. Single bonds are referred to as σ-bonds, and double bonds contain a σ-bond and a π-bond. Conjugated polymers have a σ-bond backbone of overlapping $sp^2$ hybrid orbitals. The remaining out-of-plane $p_z$ orbitals on the carbon (or nitrogen) atoms overlap with neighboring p, orbitals to give π-bonds. When the sensor element 10 that is composed of the plurality of electrically interconnected carbon nanotubes further includes a polymer matrix, the nanotubes may be deposited atop the substrate 5 using spray deposition followed by spray deposition of the polymer matrix.

Still referring to FIG. 1, the at least one electrical contact 12 to the plurality of electrically interconnected carbon nanotubes is typically composed of a metal, such as a metal foil, that provides for electrical communication between the power source 16, e.g., a battery, and the electrically interconnected carbon nanotubes. In one embodiment, the metal that provides the electrical contact 12 may be gold, copper, aluminum, silver, platinum and alloys thereof. In one example, the electrical contact 12 is provided by evaporating gold to a thickness of approximately 1000 Å onto a portion of the electrically interconnected carbon nanotubes, wherein copper wires may be subsequently attached to the electrical contact 12 using silver epoxy. It is noted that the material of the electrical contact 12 should not be limited solely to metal, as any electrically conductive material is suitable.

The power source to the sensor element 10 including the electrically interconnected carbon nanotubes can be an AC or DC power supply. In the embodiments of the invention in which the power source is a DC power supply, measurements of the resistance of the electrically interconnected carbon nanotubes are correlated to the temperature. In the embodiments of the invention in which the power source comprises an AC power supply, the capacitance of the electrically interconnected carbon nanotubes is measured and correlated to temperature. The power supply typically provides a constant value to provide a current through the electrically interconnected carbon nanotubes from which the voltage can be measured and in turn the resistance then determined.

In one embodiment, the above temperature sensor 100 is utilized in a method of measuring temperature that includes providing a sensor element 10 composed of a plurality of electrically interconnected carbon nanotubes 21 having a fixed number of junctions 23 between each of the electrically interconnected carbon nanotubes 21, applying a current through the electrically interconnected carbon nanotubes 21, measuring electrical properties of the electrically interconnected carbon nanotubes 21 in response to an application of temperature to the sensor element 10, and correlating the electrical properties of the electrically interconnected carbon nanotubes 21 to temperature. The electrical properties of the electrically interconnected carbon nanotubes 21 may be resistance or capacitance. The correlation of resistance or capacitance to temperature may be conducted using a computer.

Figure 4:
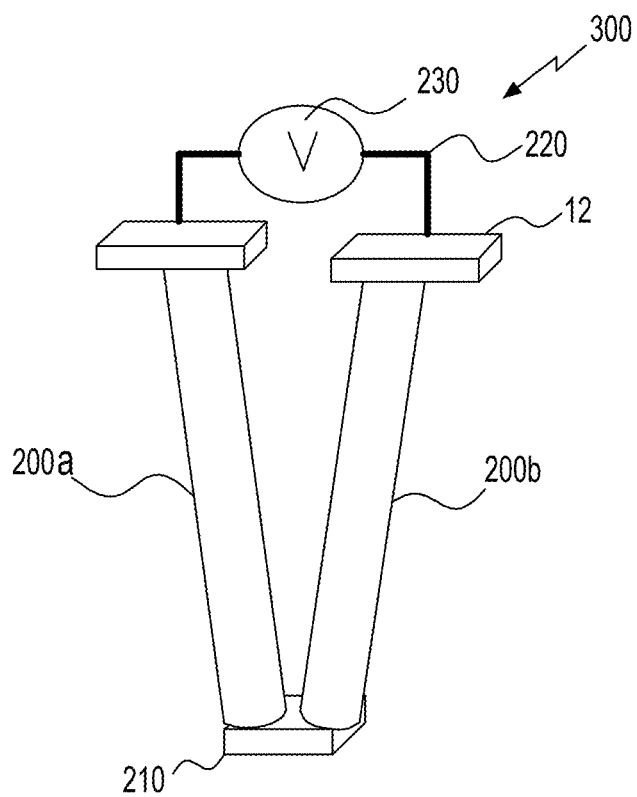
FIG. 4 depicts a side view of a temperature sensor composed of a thermocouple body that includes at least two carbon nanotubes, in accordance with one embodiment of the present invention.

In another aspect of the invention, carbon nanotubes may be configured to provide a temperature sensor having a thermocouple type arrangement. More specifically, in one embodiment, two dissimilar carbon nanotubes 200a, 200b are positioned to have at least one junction 210, as depicted by FIG. 4. In one embodiment, the temperature sensor includes a thermocouple body having a first carbon nanotube 200a and a second carbon nanotube 200b, wherein the first carbon nanotube 200a and the second carbon nanotube 200b interconnect at a junction 210 that is present at a first end of the thermocouple body, which is to be applied to the temperature to be measured. The first carbon nanotube 200a and the second carbon nanotube 200 have dissimilar electrical properties. A voltmeter 230 may be provided in electrical communication with the first carbon nanotube 200a and the second carbon nanotube 200b, wherein the application of temperature to the first end of the thermocouple body produces a current in a circuit composed of the first carbon nanotube 200a and the second carbon nanotube 200b that is proportional to the temperature.

An electric current flows in a closed circuit 300 of the two dissimilar carbon nanotubes 200a, 200b (hereafter referred to as a nanotube thermocouple circuit) when the junction 210 between the interconnected first carbon nanotube 200a and the second carbon nanotube 200b at the first end of the thermocouple body is subjected to a temperature change. In the nanotube thermocouple circuit, the current continues to flow as long as the junction 210 of the two dissimilar carbon nanotubes 200a, 200b is at a different temperature than the remaining portion of the first and second carbon nanotubes 200a, 200b. The magnitude and direction of the current depends on the temperature difference between the junction 210 and the remaining portion of the first and second carbon nanotubes 200a, 200b, and the properties of the first and second carbon nanotubes 200a, 200b. This effect is similar to the Seebeck effect that is utilized in temperature sensing using metal based thermocouples.

Any two dissimilar carbon nanotubes 200a, 200b can be used and the nanotube thermocouple circuit will generate a low voltage output that is proportional to the temperature difference between the junction 210 and the remaining portion of the first and second carbon nanotubes 200a, 200b. The term "dissimilar" as used to describe the carbon nanotubes utilized to provide the thermocouple type arrangement means that the electrical properties of the carbon nanotubes 200a, 200b in response to temperature change are not the same. In one embodiment, increasing or decreasing the number of defects that are present in the carbon nanotubes varies the electrical properties of the carbon nanotube so that a first carbon nanotube 200a is dissimilar from the second carbon nanotube 200b. Reducing the number of defects increases the conductivity of the carbon nanotubes. Therefore, the carbon nanotube having the reduced number of defects will have a lower resistance than the carbon nanotube having the greater number of defects. A carbon nanotube having a lesser degree of defects will have a lower resistance, and therefore be dissimilar than carbon nanotube having a greater degree of defects.

The number of defects that are present in a carbon nanotube may be decreased though an annealing process. Examples of annealing processes that can reduce the defects in the carbon nanotubes include annealing with pure methanol at 100° C. for a time period of approximately four hours; annealing at 1250° C. for four hours; and annealing at 2800° C. for four hours. Dissimilar carbon nanotubes may also be provided by different dopant types and concentrations within the carbon nanotubes and/or by different heat treatments of the carbon nanotubes.

For example, in one embodiment, dissimilar carbon nanotubes may be produced by varying the degree of oxygen adsorption that is present on the surface of the carbon nanotubes. For example, the concentration of oxygen that is adsorbed on the surface of the first carbon nanotube 200a may be reduced relative to the second carbon nanotube 200b by annealing the first carbon nanotube 200a in an argon containing atmosphere, wherein the anneal temperature may range from 100° C. to 1250° C.

One example of carbon nanotubes that are suitable for the first carbon nanotube 200a of the thermocouple body include carbon nanotubes doped with orthodichlorobenzene (ODCB). One example of carbon nanotubes that are suitable for the second carbon nanotube 200b of the thermocouple body include carbon nanotubes doped with thionyl chloride (or thionyl dichloride, $SOCl_2$).

The junction 210 may be provided by physical contact between the first carbon nanotube 200a and the second carbon nanotube 200b. In one example, the junction 210 may further comprises a conductive weldment between the first carbon nanotube 200a and the second carbon nanotube 200b that is provided by electron beam or laser welding.

Electrical contacts 12 to each of the first and second carbon nanotubes 200a, 200b are present opposite the junction 210. The electrical contacts 12 to the first and second carbon nanotubes 200a, 200b of the thermocouple body are similar in function and composition as the electrical contacts 12 that are described above with reference to FIGS. 1-3.

A conventional voltmeter 230 may be electrically connected to the electrical contacts 12 to provide a circuit. Using the above described nanotube thermocouple circuit, temperatures ranging from about −200° C. to about +1200° C. may be measured with voltage increments corresponding to temperature changes on the order of about 41 μV/° C. In one embodiment, thermoelectric power generated by the carbon nanotubes 200a, 200b that provide the temperature sensor having the thermocouple arrangement may be used a power source.

FIGS. 5A-6C depict embodiments of a pressure sensor 110a, 110b, composed of a plurality of nanostructures, such as vertically aligned carbon nanotubes 15. In one example, the pressure sensor 110 includes a flexible sensor element 28 composed of a plurality of vertically aligned carbon nanotubes 15, at least one electrical contact 12 to the vertically aligned carbon nanotubes 15, and a power source (not shown) in connection with the at least one electrical contact 12 that provides a substantially constant current to the plurality of vertically aligned carbon nanotubes 15, wherein the resistance or the capacitance of the plurality of vertically aligned carbon nanotubes 15 is correlated to pressure.

Figure 5A:
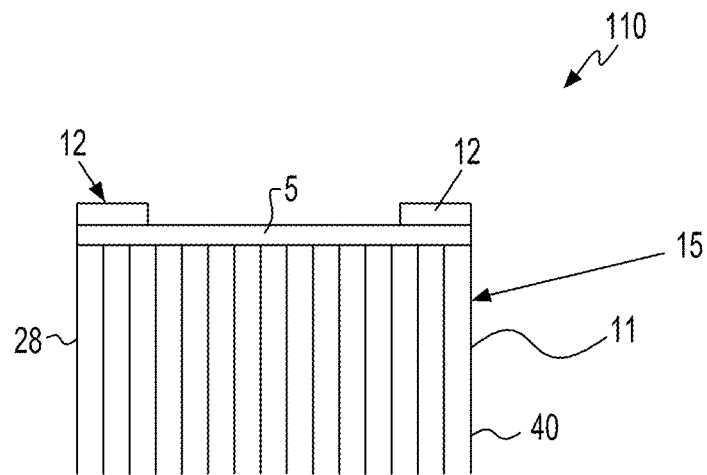
FIGS. 5A and 5B depict side cross-sectional views of one embodiment of a pressure sensor composed of a plurality of nanostructures, such as carbon nanotubes, extending from a polymer containing skin, in accordance with the present invention.
Figure 5B:
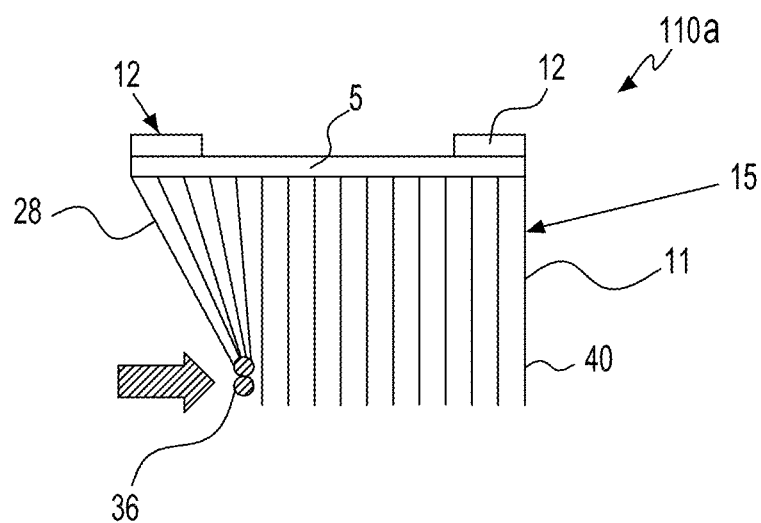

In one embodiment, pressure sensitivity of the pressure sensor 110a is provided by flexibility of the vertically aligned carbon nanotubes 15 that are arranged in parallel and extend from a substantially rigid substrate 5, as depicted in FIG. 5A. In this configuration, the vertically aligned carbon nanotubes 15 of the pressure sensor 110a resemble hairs in their sensitivity to pressure changes. The deformation of the vertically aligned carbon nanotubes 15 changes the resistivity of the carbon nanotube array significantly. For example, referring to FIG. 5B, deformation of vertically aligned carbon nanotubes 15 may result in contact between the adjacent vertically aligned carbon nanotubes 15, i.e., increased junctions between the adjacent vertically aligned carbon nanotubes 15, wherein contact between the adjacent vertically aligned carbon nanotubes 15 decreases the electrical resistance of the nanotube array. Deforming the vertically aligned carbon nanotubes 15 provides contact between adjacent nanotubes 36, which increases the number of electrically conductive paths between the electrodes 12, hence providing for lower resistance of the nanotube array. The pressure sensor 110a depicted in FIGS. 5A-5B is capable of measuring pressures less than the minimum pressure that can be sensed by human fingers, which is on the order of approximately 20 g/cm$^2$. For example, the pressure sensor 110a depicted in FIGS. 5A-5B may measure pressure values as low as 5 g/cm$^2$.

In one embodiment, the pressure sensor 110a may measure pressure values ranging from about 5 g/cm$^2$ to about 4000 g/cm$^2$. In another embodiment, the pressure sensor 110a may measure pressure values ranging from about 10 g/cm$^2$ to about 1000 g/cm$^2$. In a further embodiment, the pressure sensor 110a may measure pressure values ranging from about 50 g/cm$^2$ to about 550 g/cm$^2$. In an even further embodiment, the pressure sensor 110a may measure pressure values ranging from about 100 g/cm$^2$ to about 150 g/cm$^2$. It is noted that the above described ranges are provided for illustrative purposes and are not intended to limit the invention specifically thereto. For example, the pressure sensor 110a can measure any pressure, so long as the pressure does not diminish the structural integrity of the pressure sensor. By diminishing the structural integrity of the pressure sensor 110a it is meant that the pressure would sever the electrical connection of the vertically aligned carbon nanotubes 15 from the substrate 5.

Typically, the substrate 5 depicted in the embodiments of the invention that are consistent with FIGS. 5A and 5B is a rigid substrate, such as a polymeric substrate having a shear modulus greater than about 1.0 GPa. In another example, in which the substrate 5 is composed of a metal, the shear modulus of the substrate 5 is typically greater than 5.0 GPa. In yet another example, in which the substrate 5 is composed of a ceramic, the shear modulus is greater than about 20.0 GPa.

It is noted that the above described dimensions and pressures are provided for illustrative purposes only, since the range of pressures being measured by the structures described above may be modified by increasing or decreasing the dimensions separating the adjacent nanotubes 36 of the array of vertically aligned carbon nanotubes 15.

Figure 6A:
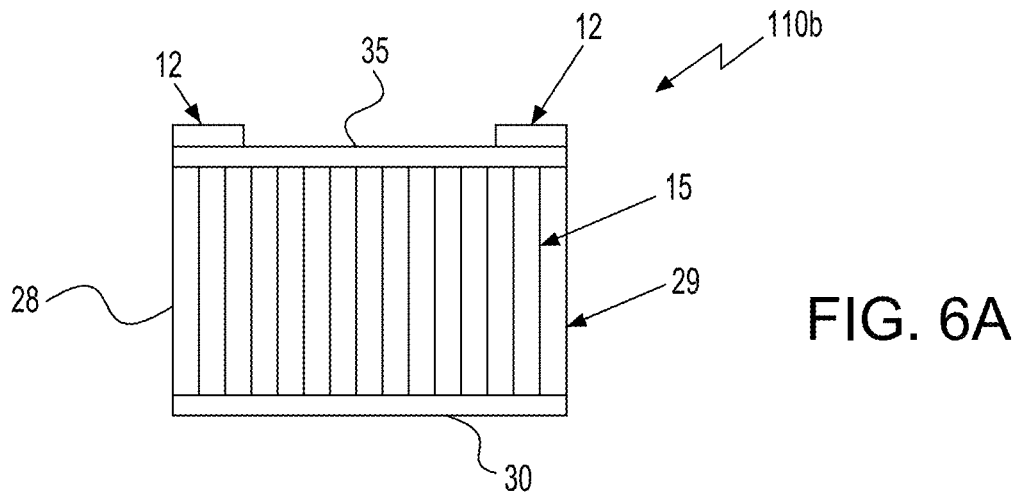
FIGS. 6A-6C depict side cross-sectional views of one embodiment of a pressure sensor composed of a plurality of nanostructures, such as carbon nanotubes, contained within a polymer skin, in accordance with the present invention.
Figure 6B:
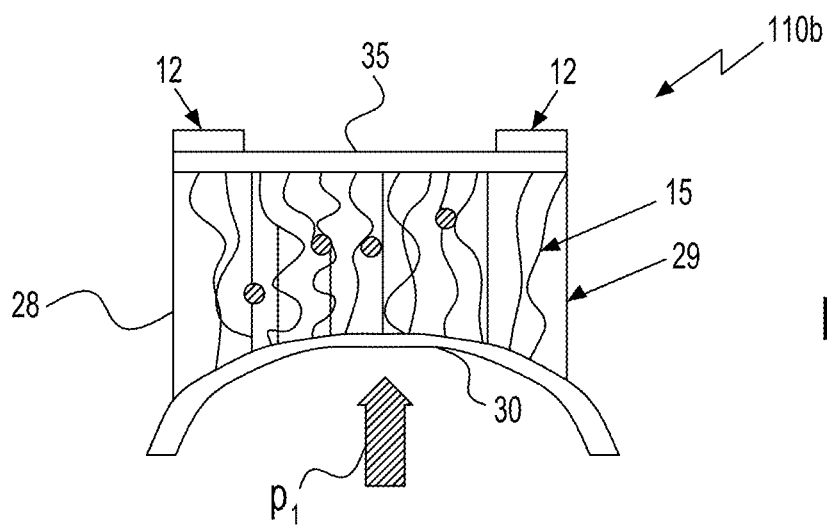
Figure 6C:
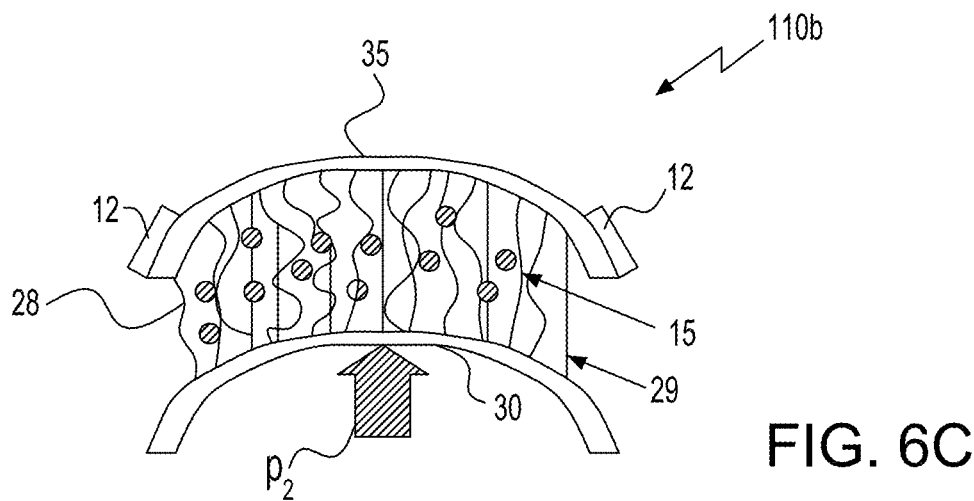

Referring to FIGS. 6A-6C, in another embodiment, pressure sensitivity of the pressure sensor 110b is provided by flexibility of the vertically aligned carbon nanotubes 15 that are contained within a flexible substrate 29. The flexible substrate 29 typically is composed of a thermoplastic polymer having a shear modulus of 1.0 GPa or less, but in some instances the flexible substrate 29 may be a thermoset polymer having a shear modulus on the order of approximately 1.5 GPa. Examples of polymers suitable for the flexible substrate 29 include parylene C, polyamide, polyimide, polybutadiene elastomer, polycarbonate, polyethylene (HDPE), polypropylene, polyurethane elastomer, and polyvinyl chloride.

Typically, the flexible substrate 29 has a shear modulus of less than about 1.5 GPa, typically ranging from about 1.0 GPa to about 0.5 GPa, and in some instances being as low as about 0.0005 GPa. FIG. 6A depicts a plurality of vertically aligned carbon nanotubes 15 that are present between a first skin 30 (also referred to as first surface) and a second skin 35 (also referred to as a second surface), prior to the application of an external pressure.

FIG. 6B depicts the application of a first pressure P1, e.g., moderate pressure, to the first skin 30 results in deformation of vertically aligned carbon nanotubes 15. In some embodiments, deformation of the first skin 30 and the vertically aligned carbon nanotubes 15 contained within the flexible substrate 29 that results in contact between the adjacent vertically aligned carbon nanotubes 15, wherein contact between the adjacent vertically aligned carbon nanotubes 15 decreases the electrical resistance of the nanotube array. In one embodiment, by deforming the vertically aligned carbon nanotubes 15 in a manner that provides contact between adjacent nanotubes, i.e., increases the junctions between the carbon nanotubes, the number of electrically conductive paths between the electrodes 12 is increased, hence providing for lower resistance of the nanotube array. Typically, the pressure applied to the pressure sensor 110b depicted in FIG. 6B may range from about 5 g/cm² to about 1000 g/cm², more typically ranging from about 10 g/cm² to about 150 g/cm², and even more typically ranging from about 50 g/cm² to about 100 g/cm².

FIG. 6C depicts the application of a second pressure P2, e.g., high pressure, that is greater than the pressure that is applied to the sensor 110b depicted in FIG. 6B. Typically, the increased pressure applied to the first skin 30 further deforms the first skin 30, the vertically aligned carbon nanotubes 15 within the flexible substrate 29 and the second skin 35, wherein the increased deformation of the vertically aligned carbon nanotubes 15 further increases the contact between adjacent nanotubes, which in turn increases the number of electrically conductive paths between the electrodes 12, hence providing for lower resistance of the nanotube array. Typically, the pressure applied to the pressure sensor 110b depicted in FIG. 6C may range from about 150 g/cm² to about 4,000 g/cm², more typically ranging from about 150 g/cm² to about 1,000 g/cm², and even more typically ranging from about 550 g/cm² to about 1000 g/cm².

It is noted that the above described dimensions and pressures are provided for illustrative purposes only, since the range of pressures being measured by the structures described above may be modified by increasing or decreasing the dimensions separating the adjacent nanotubes of the vertically aligned carbon nanotubes 15 and/or by increasing or decreasing the shears modulus of the first skin 30 and/or second skin 35.

In one embodiment, the vertically-aligned nanotube arrays (VANTAs) that are utilized in the pressure sensors 100a, 100b that are depicted in FIGS. 5A-6C can be synthesized by thermal chemical vapor deposition of hydrocarbon feedstocks onto substrates that are patterned with metal catalyst films. Broadly, in one embodiment, thermal chemical vapor deposition synthesis is achieved by providing a carbon source in a gas phase and using an energy source, such as plasma or resistively heated coil, to transfer energy to a gaseous carbon molecule. Examples of chemical vapor deposition processes suitable for forming carbon nanotubes include, but are not limited to: plasma enhanced chemical vapor deposition (PECVD), thermal chemical vapor deposition (CVD), vapor phase growth, aero gel supported chemical vapor (CVD) and laser assisted chemical vapor deposition (CVD).

The patterned metal catalyst films are composed of a single layer or multilayers of thin metal films that are deposited by electron beam evaporation, sputtering, or chemical vapor deposition. In one embodiment, the metal catalyst film may include a transition metal including but not limited to Ni, Fe, or Co. In one embodiment, following deposition the metal catalyst film is patterned using photolithography and etch processes. The metal catalyst film may be patterned to provide dots patterns, pillars, stripes, and/or functional structures, such as sensor structures.

In one embodiment, the patterned metal catalyst film includes a buffer layer, e.g., Al, which is in contact with the substrate, and a metal catalyst, e.g., 0.2-1.0 nm of Fe formed atop the buffer layer. In one embodiment, the patterned metal catalyst film includes another metal layer, such as 0.2 nm of Mo.

The substrate including the pattered metal catalyst film is then placed inside a tube furnace and the temperature is raised under hydrogen and argon gas flow at various partial pressures. In one embodiment, hydrocarbon feedstocks may include other gases, such as acetylene with hydrogen and argon, or ethanol with hydrogen and argon, or methanol with hydrogen and argon, are passed over the patterned metal catalyst in a thermal chemical vapor deposition process, wherein carbon nanotubes grow from the patterned metal catalyst film. Following chemical vapor deposition, the method of forming vertically-aligned carbon nanotubes 15 may further include infiltration of the arrays with a polymer solution, followed by exfoliation of the film containing the vertically-aligned carbon nanotubes 15 by dissolution, peeling, and then physical exfoliation. In one embodiment, the carbon nanotubes produced in forming the vertically-aligned carbon nanotubes 15 may or may not be single wall carbon nanotubes (SWNTs).

In one embodiment, the vertically-aligned carbon nanotubes 15 may be infiltrated with polymer to maintain their alignment prior to the application of external pressure. Contrary to a network of carbon nanotubes, in which adjacent nanotubes are in electrical communication to provide a conductive path through the polymer matrix, adjacent vertically-aligned carbon nanotubes are parallel to one another. In one embodiment of the present invention, vertically-aligned carbon nanotubes 15 may be grown up to several millimeters in height or grown with limited heights of only one hundred nanometers with an accuracy of about 20 nm.

Referring to FIG. 5A-6C, the at least one electrical contact 12 to the vertically aligned carbon nanotubes 15 is typically composed of a metal, such as a metal foil, that provides for electrical communication between the power source (not shown), e.g., battery, and the electrically interconnected carbon nanotubes. In one embodiment, the metal that provides the electrical contact may be copper, aluminum, silver, platinum, and alloys thereof. It is noted that the material of the electrical contact 12 should not be limited solely to metal, as any electrically conductive material is suitable.

In one embodiment, the power source to vertically aligned carbon nanotubes 15 is an AC or DC power supply. In the embodiments of the invention in which the power source is a DC power supply, measurements of the resistance of the electrically interconnected carbon nanotubes are correlated to the temperature. In the embodiments of the invention in which the power source comprises an AC power supply, the impedance of the electrically interconnected carbon nanotubes is measured and correlated to temperature. The power supply typically provides a constant value to provide a current through the electrically interconnected carbon nanotubes from which the voltage can be measured and in turn the resistance then determined. The correlation of resistance or impedance to temperature may be calibrated and calibration coefficients may used to correlate measured values to temperature.

Figure 7A:
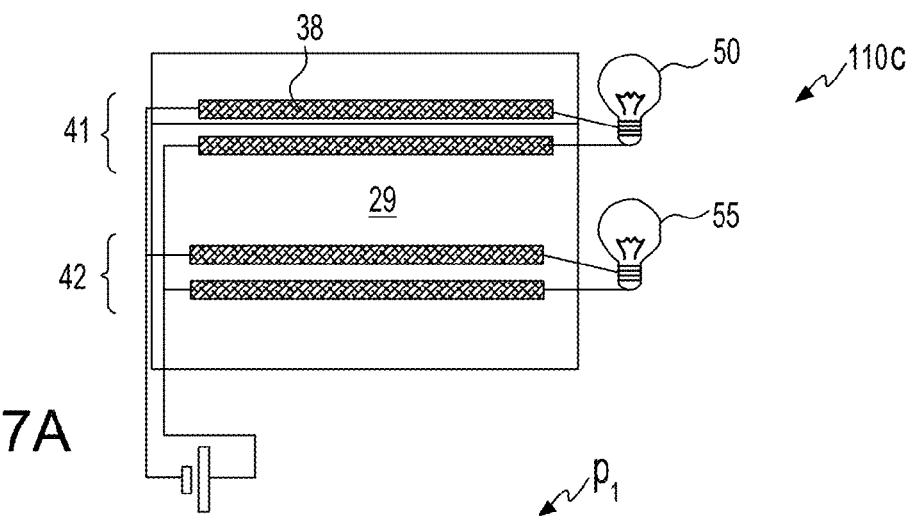
FIGS. 7A-7C depict side cross-sectional views of one embodiment of a pressure sensor that includes a layered arrangement of nanostructures, such as carbon nanotubes, in accordance with the present invention.
Figure 7B:
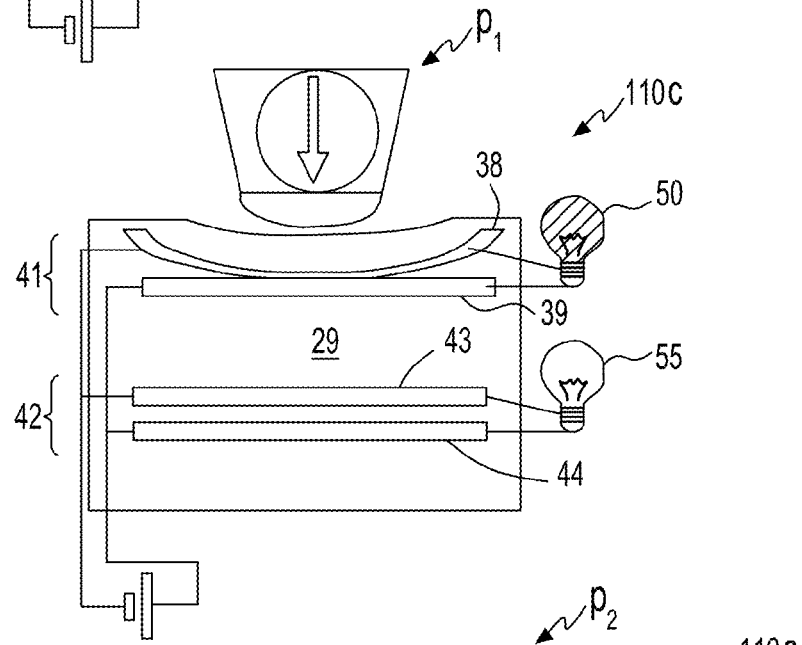
Figure 7C:
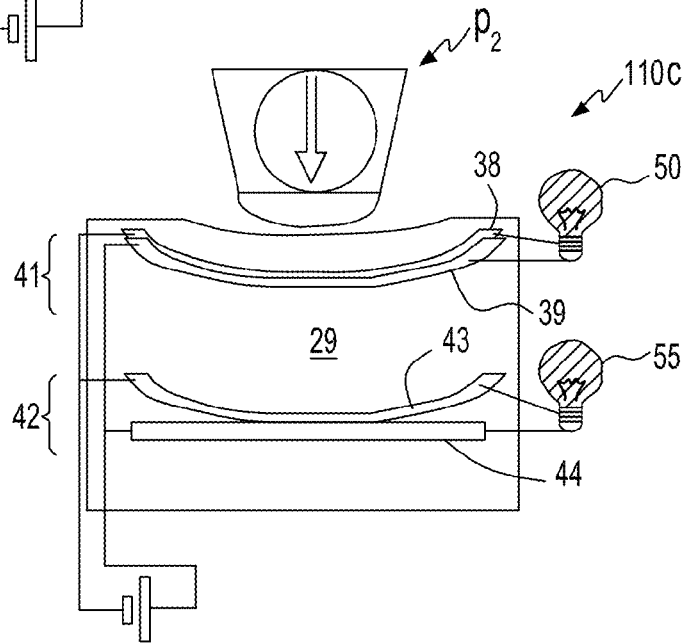

FIGS. 7A-7C depict another embodiment of a pressure sensor 110c, in which pressure sensitivity of the sensor is provided by a plurality of flexible membranes positioned in a layered arrangement, wherein each flexible membrane is composed of electrically interconnected carbon nanotubes that are present on or within a flexible matrix. In one embodiment, the first plurality 41 of flexible membranes and the second plurality 42 of flexible membranes are encased in a flexible substrate 29, i.e., flexible matrix. In one embodiment, each of the flexible membranes including the electrically interconnected carbon nanotubes has a shear modulus of less than about 5.0 GPa, typically ranging from about 1.0 GPa to about 5.0 GPa, and in some instances being less than 1.0 GPa.

FIG. 7A depicts one embodiment of a pressure sensor 110c including a lower pressure sensor 50 composed of a first plurality 41 of flexible membranes and a high pressure sensor 55 composed of a second plurality 42 of flexible membranes, in which each flexible membrane includes electrically interconnected carbon nanotubes present therein. In one embodiment, the lower pressure sensor 50 is suitable for detecting pressures less than 50 g/cm$^2$, and the high pressure sensor 55 is suitable for detecting pressures of about 100 g/cm$^2$ or greater. In one embodiment, the electrically interconnected nanotubes that are present in the flexible membranes are single wall carbon nanotubes (SWNT).

FIG. 7B depicts the application of a first pressure $P_1$, e.g., moderate pressure, to the first flexible membrane 38 of the first plurality 41 of flexible membranes that results in deformation of the first flexible membrane 38 into electrical contact with the second flexible membrane 39 of the first plurality 41 of flexible membranes. In one embodiment, the first flexible membrane 38 is separated from the second flexible membrane 39 by distance ranging from about 5 nm to about 100 nm prior to the application of the pressure. Although the first pressure $P_1$ produces electrical connectivity between the flexible membranes of the low pressure sensor 50, it is noted that the first pressure $P_1$ does not substantially deform the flexible membranes of the high pressure sensor 55. In some embodiments, contact between the adjacent first flexible membrane 38 and the second flexible membrane 39 decreases the electrical resistance of the circuit containing the first and second flexible membranes 38, 39 of the lower pressure sensor 50.

FIG. 7C depicts the application of a second pressure $P_2$, e.g., high pressure, to the first flexible membrane 38 of the first plurality 41 of flexible membranes that results in deformation of the first flexible membrane 43 into electrical contact with the second flexible membrane 44 of the second plurality 42 of the flexible membranes. In one embodiment, the first flexible membrane 43 is separated from the second flexible membrane 44 of the second plurality 42 of the flexible membranes by distance ranging from about 5 nm to about 100 nm.

It is noted that the above described dimensions and pressures are provided for illustrative purposes only, since the range of pressures being measured by the structures described above may be modified by increasing or decreasing the dimensions between the flexible membranes and by increasing or decreasing the shear modulus of the flexible membranes.

Referring to the pressure sensor 110c depicted in FIGS. 7A-7C, in one embodiment the flexible membranes are composed of electrically interconnected single wall nanotubes that are deposited on a flexible substrate. In one example, the carbon nanotubes can be electrospun or extruded. The production of the carbon nanotubes may be produced using the methods described above with reference to FIGS. 1-3. In one example, spray deposition of a mat of electrically interconnected nanotubes is followed by the spray deposition of a matrix or skin of a flexible material, such as a polymer, wherein the sequence of spray deposited materials provides the layered structure that is depicted in FIGS. 7A-7C. The pressure sensor depicted in FIG. 7A-7C may have electrical contacts 12 and power supplied similar to those described in reference to FIGS. 5A-6C.

In each of the embodiments depicted in FIGS. 5A-7C, the pressure sensor may measure pressure independent of temperature. The term "independent" as used to describe the relationship between temperature and pressure in a sensor element that is measuring pressure means that the electrical properties of the sensing element that are correlated to a pressure value are not varied by a value greater than 15% by the application of a temperature. In one embodiment, the electrical properties of the sensing element that are correlated to a pressure value are not varied by a value greater than 10% by the application of a temperature. In an even further embodiment, the electrical properties of the sensing element that are correlated to a pressure value are not varied by a value greater than 5% by the application of a temperature. In yet another embodiment, the electrical properties of the sensing element that are correlated to a pressure value are not varied by a value greater than 0.5% by the application of a temperature.

FIG. 8 depicts a sensor 100d including separate sensor elements 20a, 20b, i.e., separate pressure sensor elements 20a and temperature sensor elements 20b, for independent measurements of pressure and temperature. In one embodiment, the pressure sensor element 20a may include a vertically aligned carbon nanotubes 15 as described above with reference to FIGS. 5A-7C, and illustrated in FIGS. 12A-12C. In one embodiment, the temperature sensor element 20b includes a pad of electrically interconnected carbon nanotubes, as described above with reference to FIGS. 1-3.

In another aspect, the present invention provides a sensor that includes a sensor element composed of a plurality of electrically interconnected nanostructures, a power supply to the plurality of electrically interconnected nanostructures, wherein the connectivity of the power supply to the electrically interconnected nanostructures provides a circuit, a resonator in electrical communication with the circuit, in which resistance to the electrically interconnected carbon nanotubes is varied by application of temperature or pressure to the pad, the changes in the resistance resulting in a reactive impedance of the circuit produces changes in a frequency response of the resonator, and a converter that correlates the changes in the frequency response of the resonator to temperature or pressure. A resonator is a device that exhibits resonance or resonant behavior, that is, it naturally oscillates at some frequencies, called its resonance frequencies with greater amplitude than others.

In one embodiment, the sensors of the present invention allow for simultaneous readings of pressure and temperatures while providing for wireless engagement to systems to which the pressure and temperature readings are transmitted. More specifically, in one example, because compression of the nanotubes in the array vertically aligned carbon nanotubes or mats of electrically interconnected carbon nanotubes changes their reactive capacitance and/or DC resistance, a patterned mat of electrically interconnected carbon nanotubes, or patterned network of vertically aligned carbon nanotubes, that forms an RF antennae may also function as the sensor element of a temperature and/or pressure sensor. For example, when the resistance of the film or coil that provides an RF antennae, which is produced by patterning an array of vertically aligned carbon nanotubes or patterning a mat of electrically interconnected carbon nanotubes, the frequency response of the RF resonator will change and can be remotely detectable.

The embodiments of the present invention provide specific sensing of pressure independent of temperature and specific sensing of temperature independent of pressure. The sensors described herein display a broad range of sensing and a high degree of linearity.

The following examples are provided to further illustrate aspects of the present invention and demonstrate some advantages that arise therefrom. It is not intended that the invention be limited to the specific examples disclosed.

Example 1

Linear Temperature Dependent Resistivity

Single wall carbon nanotubes were synthesized by laser vaporization and purified by dilute $HNO_3$ reflux/air oxidation procedure. A conjugated polymer poly(2-methoxy-5-(2'-ethylhexyloxy)-1,4-phenylenevinylene)(MEHPPV) was provided having a molecular weight of 51,000 and a polydispersity of 1.1 for the matrix in which the single wall nanotubes were fixed to provide a pad of electrically interconnected carbon nanotubes. The polymer matrix and the single wall carbon nanotubes were mixed to formulate a composite material that was spin cast onto a polymeric substrate to provide the sensor element 10 of a temperature sensor 100, as depicted in FIG. 1.

A 0.1 mA drive current was then applied to the sensor element including the electrically interconnected carbon nanotubes, while the sensor element was subjected to temperatures ranging from about 20° K to about 350° K. The resistance of the electrically interconnected carbon nanotubes was measured from the temperature sensor using a two point four wire configuration in a vacuum during the above described application of temperature and plotted to provide the linear temperature dependent resistivity (normalized to resistance at 300° K) that is depicted in FIG. 9A. As illustrated in FIG. 9A, the experimental results (resistance v. temperature) could be fitted to a linear plot (R=0.9998) illustrating the linear temperature dependent resistivity of the temperature sensor. The temperatures sensor sensitivity was measured to be 1.18+0.01 µV per degree with less than a 1% error.

FIG. 9B depicts the linear temperature dependent resistivity of similarly prepared temperature sensor, in which the substrate is composed of a glass. Similar to the temperature sensor that includes a polymer based substrate, the temperature sensor having the glass substrate produced experimental results that could be fitted to a linear plot (R=0.99979) illustrating the linear temperature dependent resistivity of the temperature sensor.

FIG. 9C depicts the linear temperature dependent resistivity of a glass substrate having a sensor element including carbon nanotubes doped with orthodichlorobenzene, which illustrates that doping the carbon nanotubes does not affect the linearity of the resistance response of the carbon nanotubes to changes in temperature.

In each of the above examples, the linear temperature dependent resistivity of the temperature sensor did not appreciably change when subjected to pressure variations ranging from atmospheric pressure to $10^{-7}$ mmHg. Further, the linear temperature dependent resistivity of the temperature sensor did not change when subjected to static pressures as great as 200 g/5 mm.

Example 2

Linear Temperature Dependent Resistivity Independent of Pressure

Figure 10A:
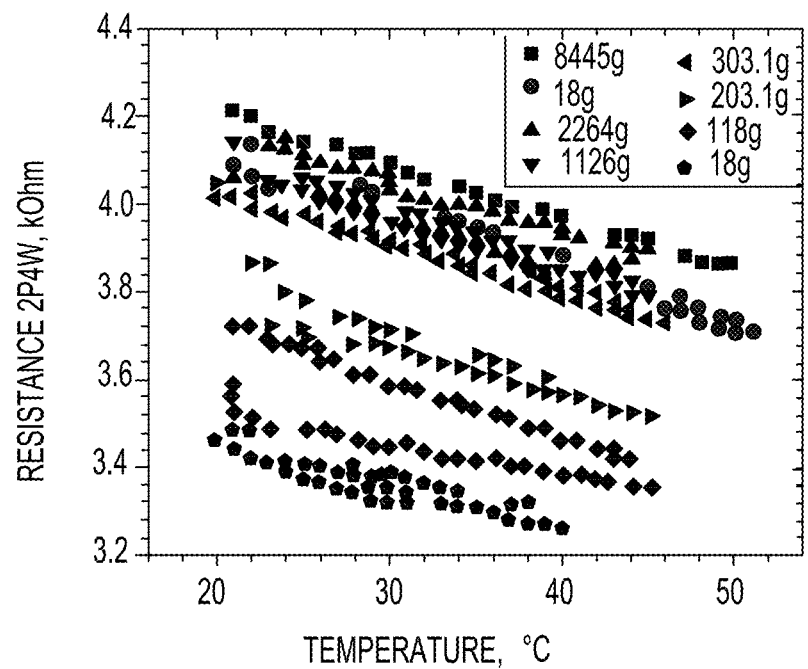
FIGS. 10A, 10B, and 10C are plots depicting the effect of pressure on the temperature sensing abilities of the sensor that provided the data illustrated in FIGS. 9A-9C.
Figure 10B:
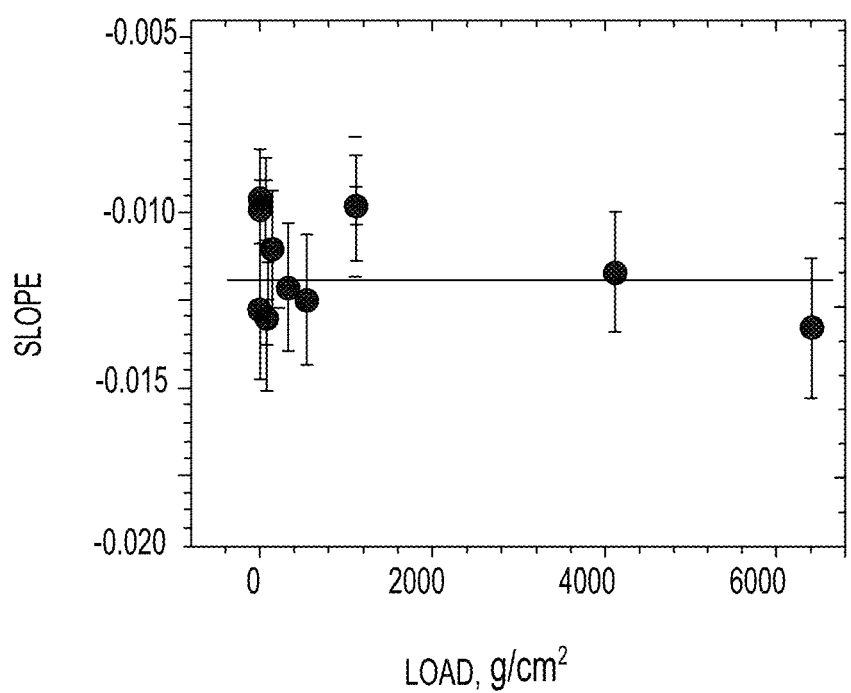

FIGS. 10A and 10B are plots depicting the effect of static pressure on the temperature sensing abilities of the temperature sensor that provided the data illustrated in FIG. 9A. FIG. 10A depicts there is substantially no change in the linear response of the electrical properties of the sensing element to changes in temperature by the application of pressure to temperature sensor elements composed of single wall carbon nanotubes in which the number of junctions between each of the electrically interconnected nanostructures is fixed.

The temperature sensors were exposed to temperatures ranging from 20° C. to 50° C., and static pressures ranging from 10 g/cm² to 4,000 g/cm². The static pressure was provided by applying a load ranging from 18 g to approximately 8,445 g to an area of the sensor element on the order approximately 2.05 cm². While under the applied load, the temperature sensor was subjected to increasing temperature, wherein the electrical properties, i.e, resistance of the temperature sensor, was then measured and plotted in FIG. 10A.

The slope for the linear temperature dependent resistivity was then plotted in FIG. 10B as a function of the static pressure. FIG. 10B indicates a variation of less than 0.005 kOhm/° C. in the slope of the linear temperature dependent resistivity response of the temperature sensor when being subjected to pressures ranging from about 10 g/cm² to about 6,250 g/cm². FIG. 10B indicates that the application of pressure does not change the linear response of the electrical properties of the sensing element to variations in temperature. It is noted that the variation in the slope of the linear temperature dependent resistivity response of the temperature sensor that is plotted in FIG. 10B is within the experimental error for measuring the electrical properties of the temperature sensor, such as the variation in the contact resistance of the measurement device to the temperature sensor.

Figure 10C:
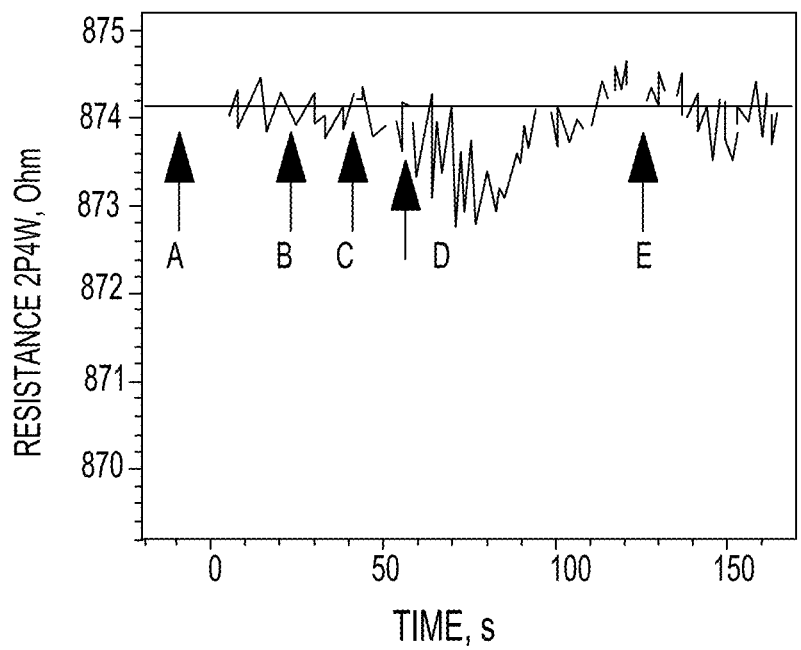

FIG. 10C depicts the effect of varying pressure, i.e., increasing pressure, on the temperature sensing abilities of the temperature sensor that provided the data illustrated in FIG. 9A. In this example, a weight is placed on the sensor element having an area of 6.25 cm$^2$, wherein the temperature sensor is being subjected to a temperature of 50° C. The resistance of the temperature sensor was then measured as the weight being place on the sensor element was increased. At points A and E, the sensor was loaded with 31.2 g/cm$^2$, and at points B, C, and D, the load was increased to 63.68 g/cm$^2$, 170.24 g/cm$^2$ and 178.24 g/cm$^2$. At each of these points, i.e., A, B, C, D, and E, the resistance measured from the temperature sensor was substantially constant. FIG. 10C indicates that the application of pressure does not affect the electrical property response of the sensing element to variations in temperature.

Example 3

Pressure Sensing

Figure 11A:
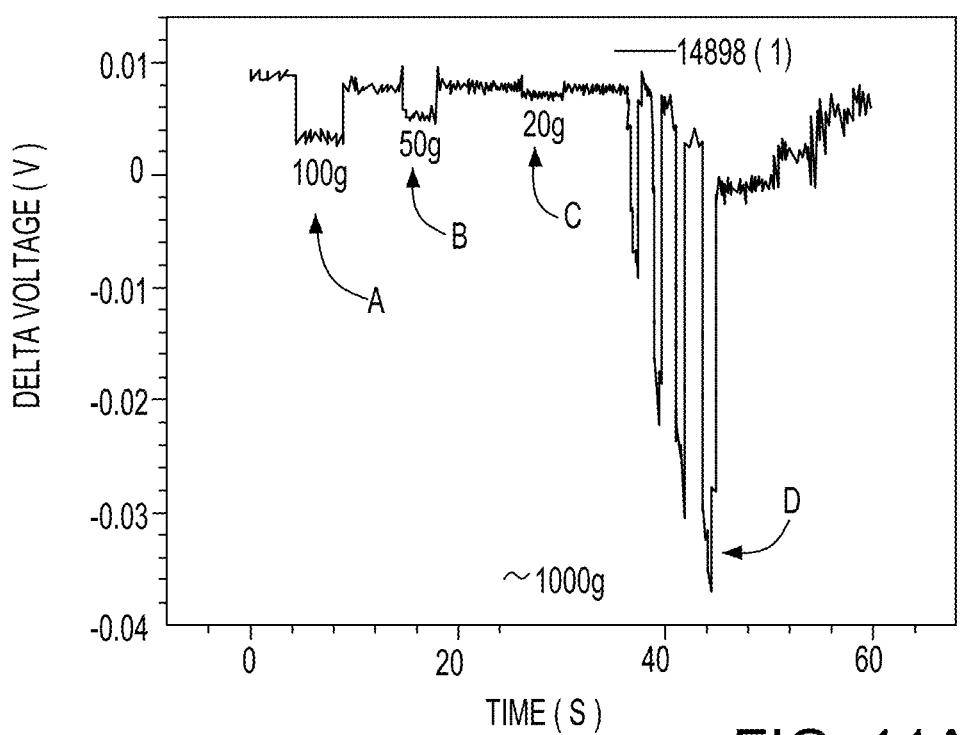
FIGS. 11A-11B are plots of a change in voltage (delta voltage (V)) as a function of time that illustrates the pressure sensing performance of a pressure sensor composed of vertically aligned carbon nanotubes, as used in accordance with the present invention.
Figure 11B:
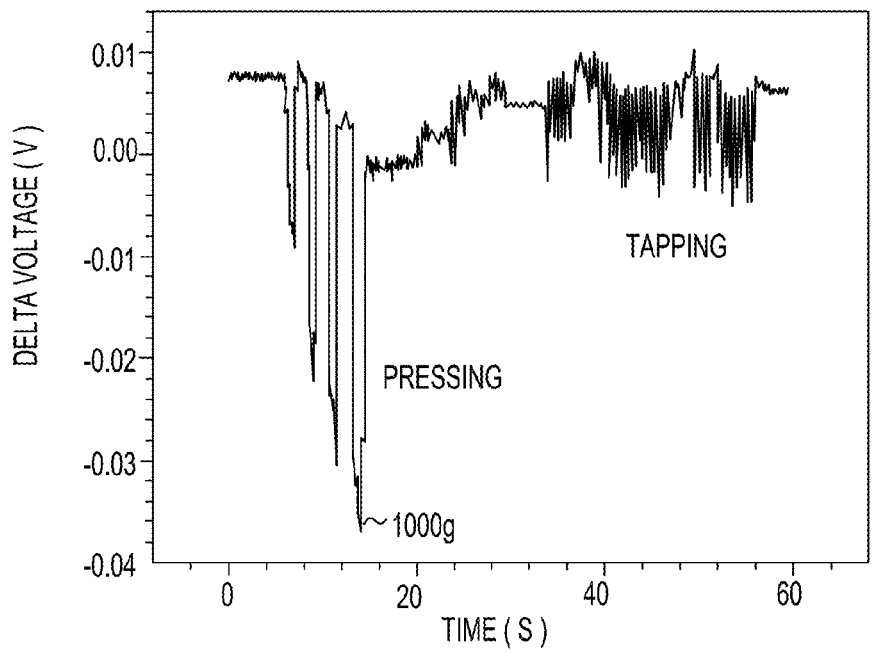

FIGS. 11A and 11B are plots of a change in voltage (delta voltage (V)) that is measured from the sensor element of a pressure sensor as a function of time, which illustrates the pressure sensing performance of a pressure sensor composed of vertically aligned carbon nanotube.

Figure 12A:
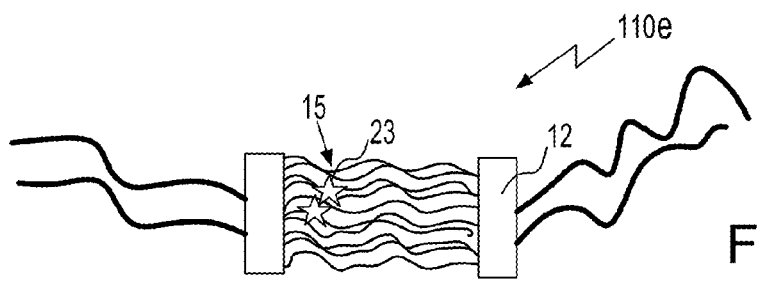
FIGS. 12A-12C are illustrations of a pressure sensor used to provide the plots depicted in FIGS. 11A-11B, in which the pressure sensor is composed of a plurality of vertically aligned carbon nanotubes extending from a first electrode to a second electrode, in accordance with the present invention.
Figure 12B:
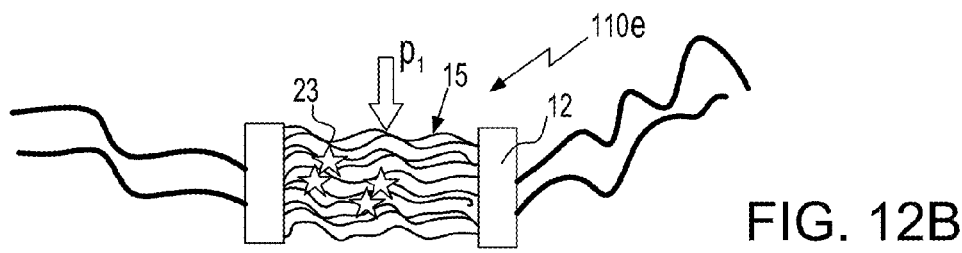
Figure 12C:
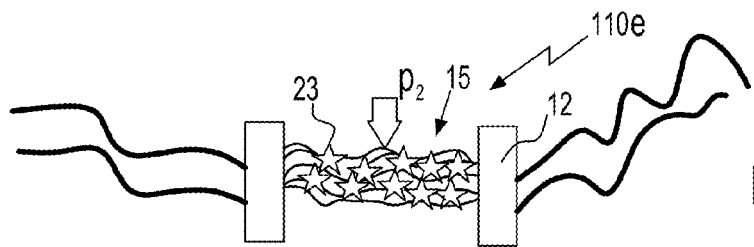

FIGS. 12A-12C illustrate the pressure sensor 110e that was used to generate the plots included in FIGS. 11A and 11B. The pressure sensor 110e includes a bundle of vertically aligned carbon nanotubes 15 that is in electrical communication with metal electrodes 12 at opposing ends of the bundle of vertically aligned carbon nanotubes 15. The electrodes 12 and connections thereto were arranged in a two point four wire configuration. FIGS. 12A-12C illustrate a progression in the pressure being applied to the pressure sensor 110e. FIG. 12A illustrates the bundle of vertically aligned carbon nanotubes 15 prior to the application of pressure. FIG. 12B illustrates the bundle of vertically aligned carbon nanotubes 15 being subjected to a low pressure P1, in which the number of junctions 23 between the vertically aligned carbon nanotubes is increased in comparison to the number of junctions 23 between the vertically aligned carbon nanotubes when not subjected to pressure. FIG. 12C depicts the pressure sensor 110e being subjected to a higher pressure P2 (P2>P1). The number of junctions 23 between the vertically aligned carbon nanotubes 15 increases as the pressure is increased from a low pressure P1, as depicted in FIG. 12B, to a high pressure P2, as depicted in FIG. 12C. The resistivity of the bundle of carbon nanotubes 15 decreases as the number of junctions 23 between the vertically aligned carbon nanotubes 15 increases.

Referring back to FIG. 11A, the application of pressure to the sensor element of the pressure sensor provides a voltage change as illustrated at points A, B, C, and D, which correspond to pressure loadings of 100 g, 50 g, 20 g, and approximately 1000 g. As illustrated in FIG. 11A, as the pressure loading increases the change in the voltage increases.

FIG. 11B depicts the electrical response of a pressure sensor, as depicted in FIGS. 12A-12C, to a constant pressure and to repeated tapping. The frequency of the repeated tapping ranged from 0.1 tap/second to 3 taps/second. The tapping area was about 5 mm$^2$.

Figure 13A:
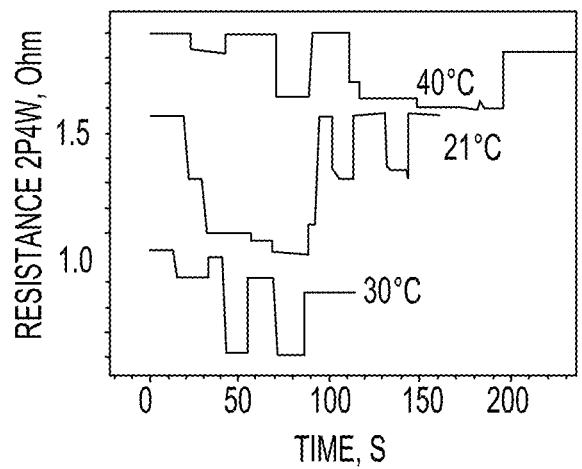
FIGS. 13A, 13B, and 13C are plots depicting the effect of temperature on the pressure sensing abilities of a pressure sensor including vertically aligned carbon nanotubes, in accordance with the present invention.
Figure 13B:
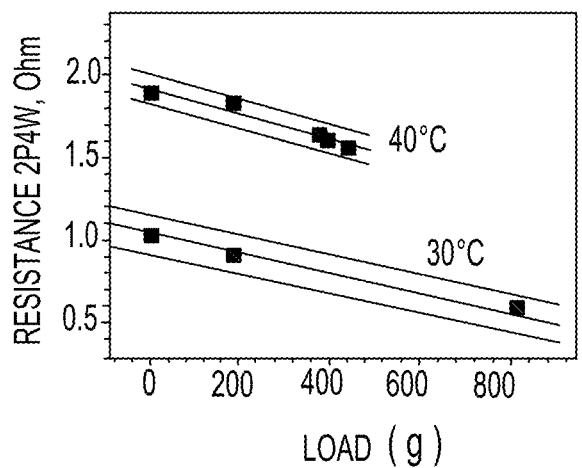
Figure 13C:
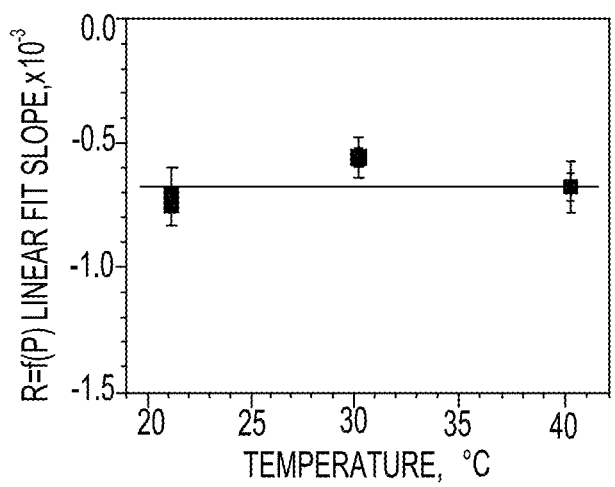

FIG. 13A-FIG. 13C depict that pressure sensors, as depicted in FIGS. 12A-12C, having sensor elements composed of vertically aligned carbon nanotubes 15 measure pressure independent of temperature. FIG. 13A depicts the electrical response, i.e., resistance response, of the pressure sensor to increasing loads at 21° C., 30° C., and 40° C.

FIG. 13B illustrates that the resistance response of the pressure sensor when plotted as a function of the applied load, i.e., pressure, provides a linear plot that is independent of the temperature being applied to the pressure sensor. The data provided in FIG. 13B was produced by a pressure sensor composed of vertically aligned carbon nanotubes, as depicted in FIGS. 12A-12C, being subjected to loads ranging from about 0 g to about 850 g at temperatures of 30° C. and 40° C. The slope of plot of the resistance as a function of the applied load for the pressure sensor subjected to a temperature of 30° C. is substantially the same as the plot of the slope of the resistance as a function of the applied load for the pressure sensor subjected to a temperature of 40° C. It is noted that the plots illustrated on FIG. 13B are vertically offset from one another for the purposes of more clearly depicting the data included therein.

The slope for the linear pressure response in the electrical properties, i.e, resistance, of the pressure sensor illustrated in FIG. 13B was then plotted in FIG. 13C as a function of temperature. FIG. 13C indicates a variation of less than 0.5 Ohm/° C. in the slope of the linear pressure response of the pressure sensor when being subjected to temperatures ranging from approximately 21° C. to approximately 40° C. FIG. 13C indicates that the application of temperature does not change the linear response of the electrical properties of the sensing element to variations in pressure. It is noted that the variation in the linear pressure response of the electrical properties of the pressure sensor that is plotted in FIG. 13B is within the experimental error for measuring of electrical properties of the pressure sensor, such as the variation in the contact resistance of the measurement device to the pressure sensor.

Example 4

Temperature Sensing by Impedance Measurements

Temperature sensors having wireless properties that were produced from single wall nanotube (SWNT) mats that were either formed into an RF antenna using injetting, or by using patterning methods. The reactive capacitance and/or DC resistance of the RF antenna formed from the SWNT mat changes in response to temperature or pressure. This provides the RF antenna the ability to measure and transmit a wireless readout of pressure or temperature changes.

Figure 14A:
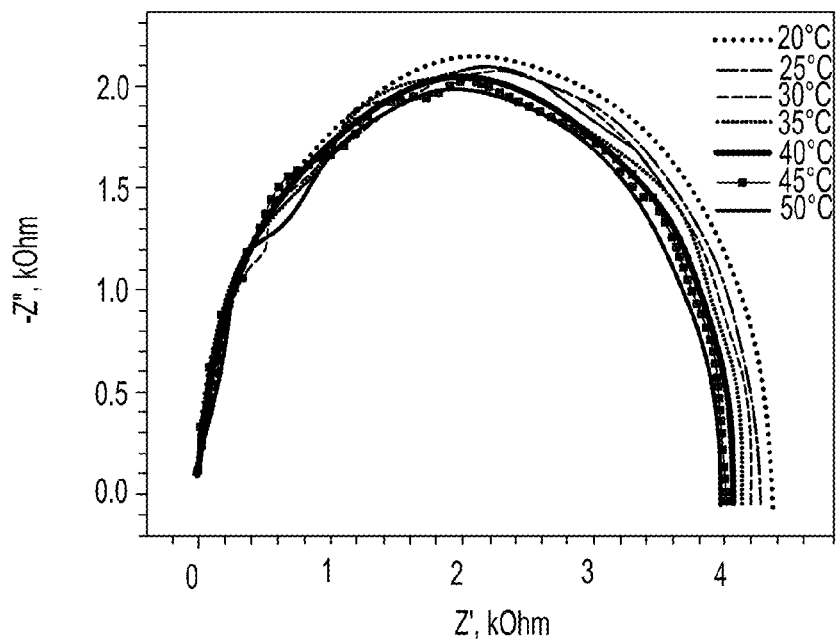
FIGS. 14A-14C depict the frequency response of a sensor being subjected to temperature changes, wherein the sensor includes a sensor element having carbon nanostructures present therein, in accordance with one embodiment of the present invention.
Figure 14B:
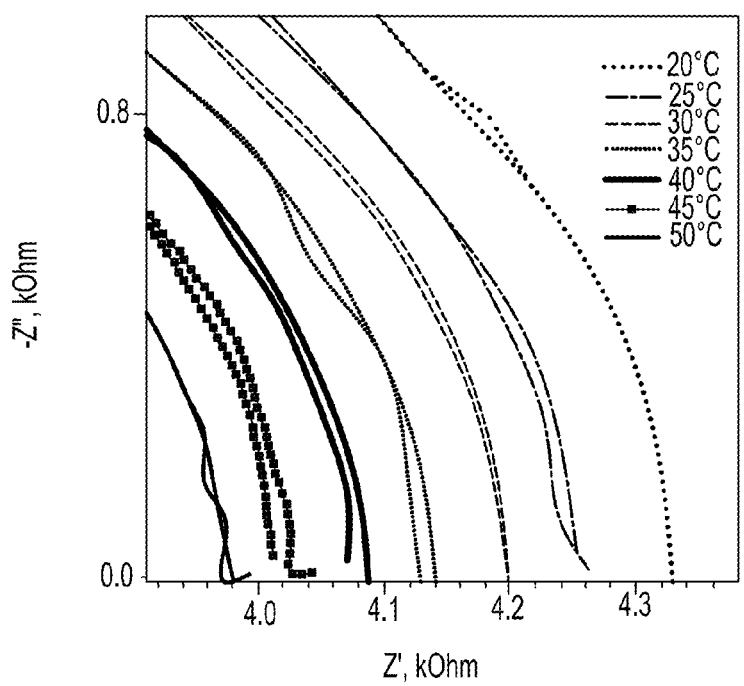

FIG. 14A depicts that the frequency range in which a mat of single wall carbon nanotubes exhibits temperature response is from 300 kHz to 1 Hz. 300 kHz represents the critical frequency of the mat of single wall carbon nanotubes, and 1 Hz represents the minimum frequency of the mat of single wall carbon nanotubes. FIG. 14A depicts the temperature response of the single carbon wall nanotube (SWNT) mats plotted on a Nyquist plot. The y-axis of the Nyquist plot depicted in FIG. 14A is the imaginary impedance (Z"), and the x-axis is the real impedance (Z'). The data plotted in FIG. 14A illustrates that for frequencies ranging from the minimum frequency, e.g., 1 Hz, to the maximum frequency, e.g., 300 kHz, of the single wall carbon nanotubes there is no overlap between the plots of the imaginary impedance (Z") versus the real impendence (−Z"=f(Z)) that is measured from the mat of single wall carbon nanotubes that is being subjected to temperatures ranging from 20° C. to 50° C. FIG. 13B illustrates a magnified portion of the low frequency portion of the plot that is depicted in FIG. 13A to more clearly illustrate that the plots of the imaginary impedance (Z") versus the real impendence (−Z"=f(Z)) for the carbon nanotubes being subjected to temperatures ranging from 20° C. to 50° C. do not overlap. FIGS. 14A and 14B illustrate that the impedance response of the carbon nanotubes can provide the basis of temperature measurements.

Figure 14C:
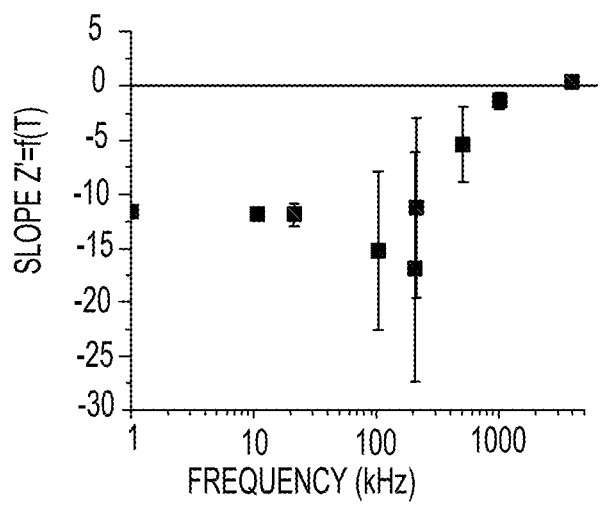

FIG. 14C depicts the slope of the real impedance response as a function of temperature (Z'=f(T)) plotted against frequency. The slope of the real impedance response as a function of temperature (Z'=f(T)) was calculated from a linear regression fit at a fixed set of frequencies. The slope of the real impedance response remained relatively unchanged within experimental error up to 300 kHz, which illustrates frequency-independent temperature sensing in 1 Hz to 300 kHz frequency range. Although not depicted in FIG. 13C, similar trends are expected for frequencies less than 1 Hz. At frequencies greater than 4 MHz, the single wall nanotubes do not show temperature response.

The temperature sensor can be used in a two frequency mixing model. The first frequency, which is smaller than critical frequency, may include information about temperature, and the second frequency, which is greater than the critical frequency, may include a bit (binary information) on whether the sensor reading is correct (bit=0). For example, if a high pressure and/or temperature, or other stimuli, damage or destroy the sensor, a reading of a non-zero slope at high frequency (bit≠0) will indicate such a condition.

Figure 14D:
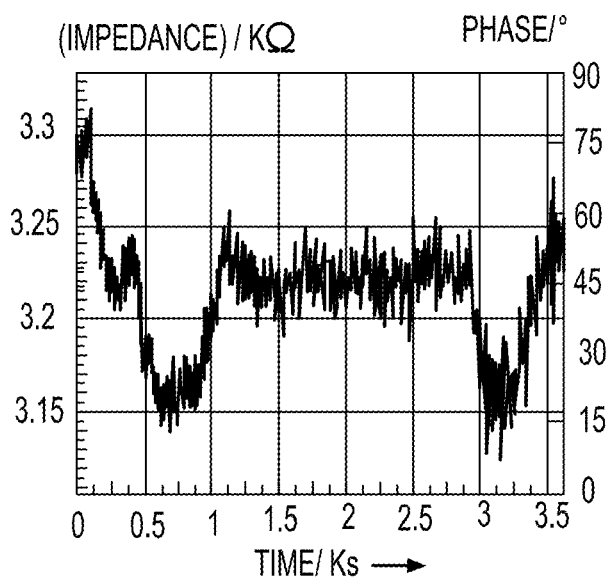
FIGS. 14 D and 14E are plots that illustrate the impedance response of a mat of single wall carbon nanotubes to changes in temperature.
Figure 14E:
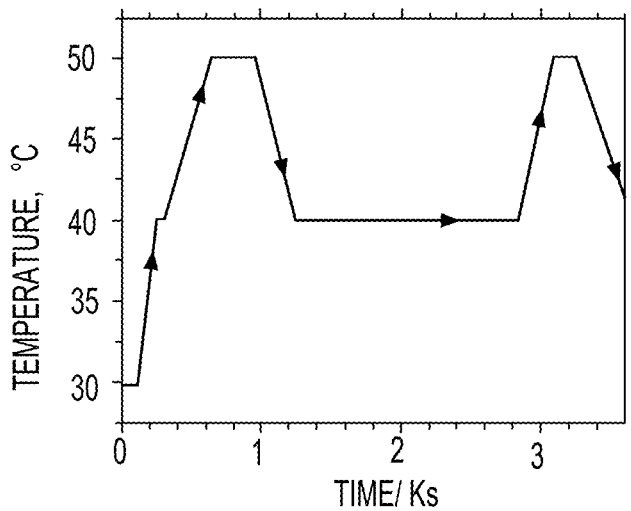

FIG. 14D illustrates the impedance response of a single carbon wall nanotube (SWNT) mat to heating and cooling. More specifically, FIG. 14D illustrates that the amplitude of the impedance response is directly proportional to temperature change and is reproducible. FIG. 14E depicts the experimental temperature profile. In the experiments illustrated in FIGS. 14D and 14E, the temperature sensor was operating a fixed frequency of 100 KHz and an amplitude of 10 mV. The amplitude of the impedance response is directly proportional to the temperature change and is reproducible. Further, there was no observable phase change shift, which illustrates that the temperatures response of the sensor is generated by the resistive component of the nanotube network and not the capacitive component.

While the present invention has been particularly shown and described with respect to the preferred embodiments thereof, it will be understood by those skilled in the art that the foregoing and other changes in forms of details may be made without departing from the spirit and scope of the present invention. It is therefore intended that the present invention not be limited to the exact forms and details described and illustrated, but fall within the scope of the appended claims.

What is claimed:

1. A temperature sensor comprising:
   a thermocouple body comprising a first carbon nanotube and a second carbon nanotube, wherein the first carbon nanotube and the second carbon nanotubes comprise a junction at a first end of the thermocouple body, wherein the first carbon nanotube and the second carbon nanotube have dissimilar electrical properties, and wherein the first carbon nanotube has a greater number of defects than the second carbon nanotube; and
   a voltmeter in electrical communication with the first carbon nanotube and the second carbon nanotube, wherein application of temperature to the first end of the thermocouple body produces a current in a circuit composed of the first carbon nanotube and the second carbon nanotube that is proportional to the temperature.

2. The temperature sensor of claim 1, wherein the current in the circuit composed of the first carbon nanotube and the second carbon nanotube is linearly proportional to the temperature that is applied to the first end of the thermocouple.

3. The temperature sensor of claim 1, wherein the voltmeter is electrically connected to the first carbon nanotube and the second carbon nanotube at a second end of the thermocouple body, wherein the second end of the thermocouple body is opposite the first end of the thermocouple body.

4. The temperature sensor of claim 1, wherein the temperature sensor measures values ranging from about −200° C. to about +1200° C.

5. The temperature sensor of claim 1, wherein the temperature sensor is configured to be connectable to a load, and wherein the current produced by the circuit powers the load.

6. The temperature sensor of claim 1, wherein measured voltage is correlated to temperature.

7. The temperature sensor of claim 6, wherein the first carbon nanotube and the second carbon nanotube are configured for a measure voltage change of about 41 μV/° C.

* * * * *